(12) United States Patent
Nesnas et al.

(10) Patent No.: US 8,496,077 B2
(45) Date of Patent: Jul. 30, 2013

(54) ROBOTIC TWO-WHEELED VEHICLE

(75) Inventors: Issa A. D. Nesnas, Pasadena, CA (US);
Jaret B. Matthews, Pasadena, CA (US);
Jeffrey E. Edlund, Pasadena, CA (US);
Joel Burdick, Pasadena, CA (US);
Pablo Abad-Manterola, Lake Forest, IL (US)

(73) Assignee: California Institute of Technology, Pasadena, CA (US)

( * ) Notice: Subject to any disclaimer, the term of this patent is extended or adjusted under 35 U.S.C. 154(b) by 41 days.

(21) Appl. No.: 13/096,391

(22) Filed: Apr. 28, 2011

(65) Prior Publication Data
US 2012/0273284 A1 Nov. 1, 2012

(51) Int. Cl.
*B62D 61/00* (2006.01)

(52) U.S. Cl.
USPC ............... 180/7.5; 180/218; 180/21; 180/7.1

(58) Field of Classification Search
USPC ..................................... 180/7.5, 218, 21, 7.1
See application file for complete search history.

(56) References Cited

U.S. PATENT DOCUMENTS

| | | | |
|---|---|---|---|
| 4,621,562 A * | 11/1986 | Carr et al. ..................... | 89/41.05 |
| 4,648,853 A * | 3/1987 | Siegfried ....................... | 446/448 |
| 6,502,657 B2 * | 1/2003 | Kerrebrock et al. .......... | 180/218 |
| 6,548,982 B1 * | 4/2003 | Papanikolopoulos et al. ......................... | 318/568.11 |
| 6,860,346 B2 * | 3/2005 | Burt et al. ...................... | 180/8.2 |
| 7,056,185 B1 * | 6/2006 | Anagnostou ................... | 446/456 |
| 7,492,116 B2 * | 2/2009 | Oleynikov et al. ....... | 318/568.12 |
| 7,559,385 B1 * | 7/2009 | Burt et al. ..................... | 180/65.1 |
| 7,772,796 B2 * | 8/2010 | Farritor et al. ........... | 318/568.12 |
| 8,162,351 B2 * | 4/2012 | Lee et al. ...................... | 280/755 |
| 8,186,469 B2 * | 5/2012 | Yim et al. ..................... | 180/218 |
| 8,197,298 B2 * | 6/2012 | Willett ......................... | 446/164 |
| 2003/0137268 A1 * | 7/2003 | Papanikolopoulos et al. ......................... | 318/568.11 |
| 2010/0152922 A1 * | 6/2010 | Carlson et al. ..................... | 701/2 |
| 2010/0243357 A1 * | 9/2010 | Yim et al. ..................... | 180/218 |
| 2011/0174565 A1 * | 7/2011 | Rochat et al. ................. | 180/167 |
| 2012/0185087 A1 * | 7/2012 | Kang ............................ | 700/245 |

OTHER PUBLICATIONS

Abad-Manterola, P., et al., Wheel Design and Tension Analysis for the Tethered Axel Rover on Extreme Terrain, Big Sky, MT, Mar. 2009, 1-8.
Abad-Manterola, P., et al., A Minimalist Tethered Rover for Exploration of Extreme Planetary Terrains, IEEE Robotics & Automation Magazine 2009, 44-52.
Abad-Manterola, P., et al., Axel Rover Paddle Wheel Design, Efficiency, and Sinkage on Deformable Terrain, 2010 IEEE Int'l. Conference on Robotics and Automation, Anchorage, AK, May 3-8, 2010, 2821-2827.
Nesnas, I., Axel Mobility Platform for Steep Terrain Excursions and Sampling on Planetary Surfaces, IEEE Aerospace Conference, Big Sky, Montana, Mar. 2008, pp. 1-11.

(Continued)

*Primary Examiner* — Kevin Hurley
*Assistant Examiner* — Michael Stabley
(74) *Attorney, Agent, or Firm* — Steinfl & Bruno LLP

(57) ABSTRACT

A robotic two-wheeled vehicle comprising a connection body interposed between the two wheels are described. A drum can be coaxially located in a central region of the connection body and can support a hollow arm projecting radially from the drum. A tether can be inserted in the arm and connected to a second drum. Instruments and sensors can be accommodated in a case housed inside each wheel.

17 Claims, 21 Drawing Sheets

OTHER PUBLICATIONS

Abad-Manterola, P., et al., Motion Planning on Steep Terrain for the Tethered Axel Rover, 2011 IEEE Int'l. Conf. On Robotics & Automation, Shanghai Intl. Conf. Center, May 9-13, 2011, Shangai, China, pp. 4188-4195.

Nesnas, I., et al., Axel and DuAxel Rovers for the Sustainable Exploration of Extreme Terrains, Journal of Field Robotics 2012, 1-23.

Nesnas, I., et al., The Axel Marsupial Rover for Challenging Terrain Sampling, Intl. Symp. on Artificial Intelligence, Robotics and Automation 2008, 1-9.

Nesnas, I., Reconfigurable Exploratory Robotic Vehicles, NASA Tech Briefs 2001, 56.

Howard, A., et al., A Reconfigurable Robotic Exploratory Vehicle for Navigation on Rough Terrain, $10^{th}$ Int'l. Symp. on Robotics & App., Jun. 2004, 1-6.

Bauer, R., et al. Experimental and Simulation Results of Wheel-Soil Interaction for Planetary Rovers, International Conference on Intelligent Robots and Systems, IEEE 2005, Aug. 2-6, 2005, pp. 1-6.

Bauer, R., et al. The Autonomous City Explorer Project: Aims and System Overview, Proc. of the 2007 IEEE/RSJ Int'l Conf. on Intelligent Robots and Systems, Oct. 29-Nov. 2, 2007, pp. 560-565.

* cited by examiner

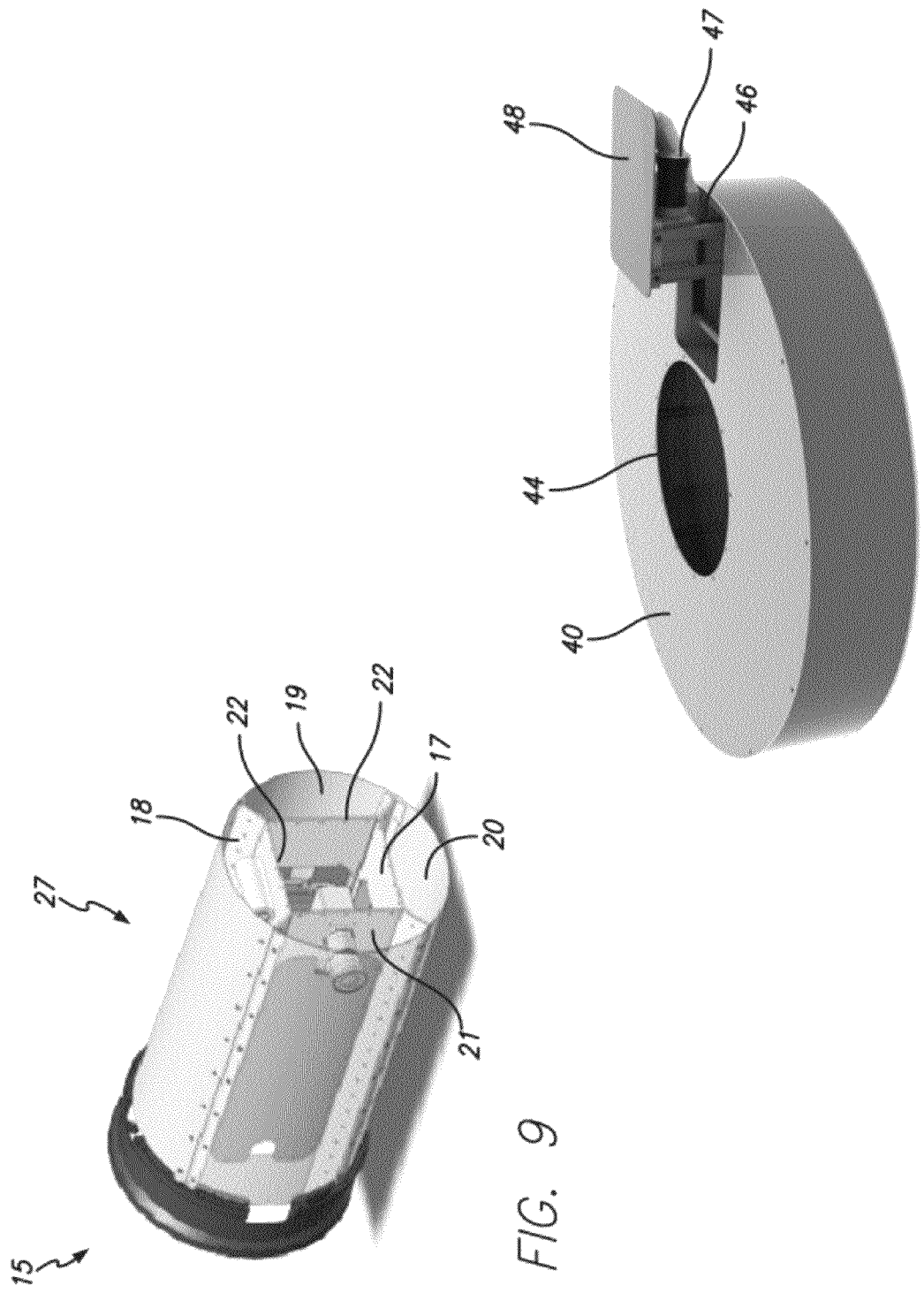

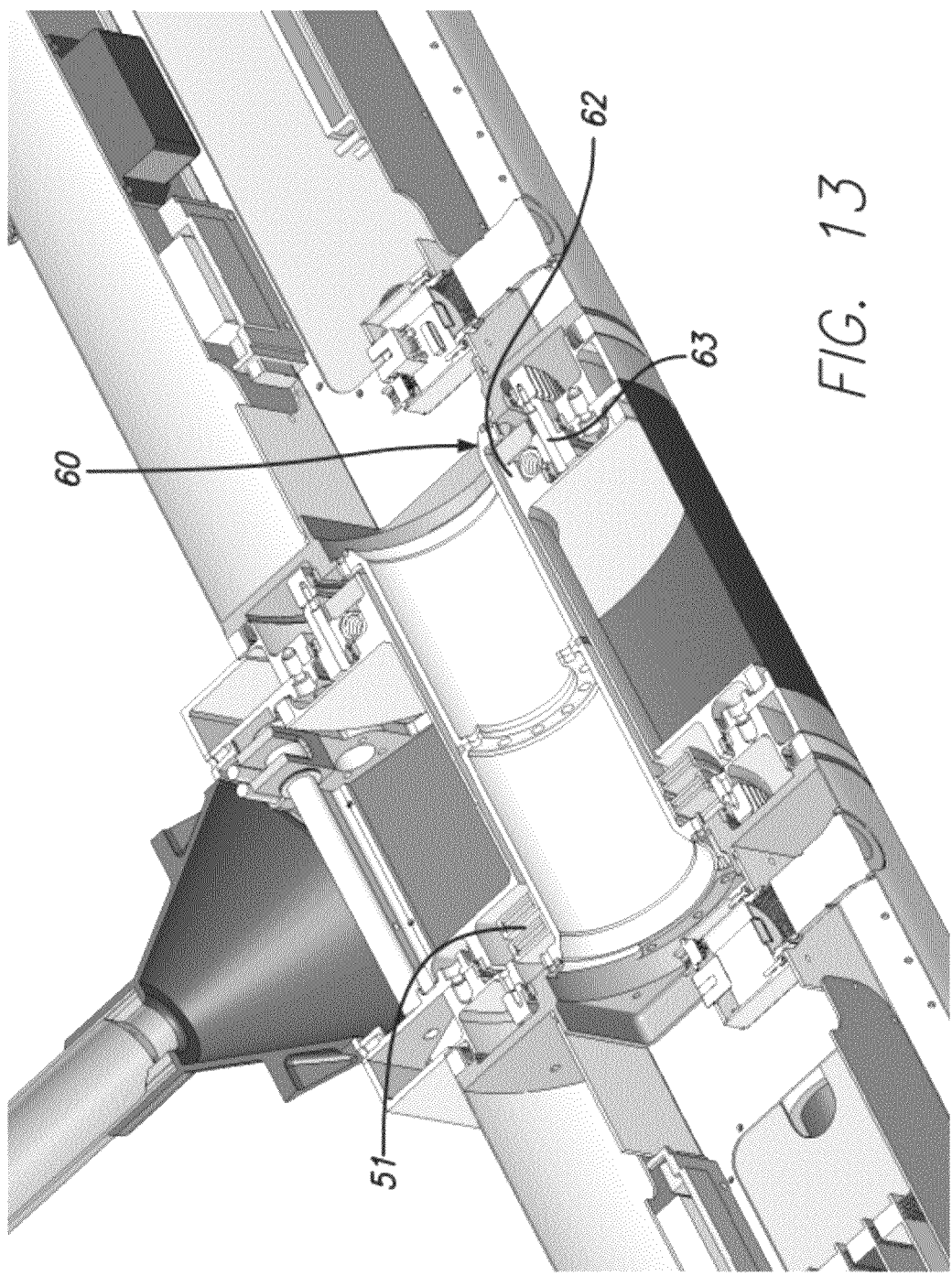

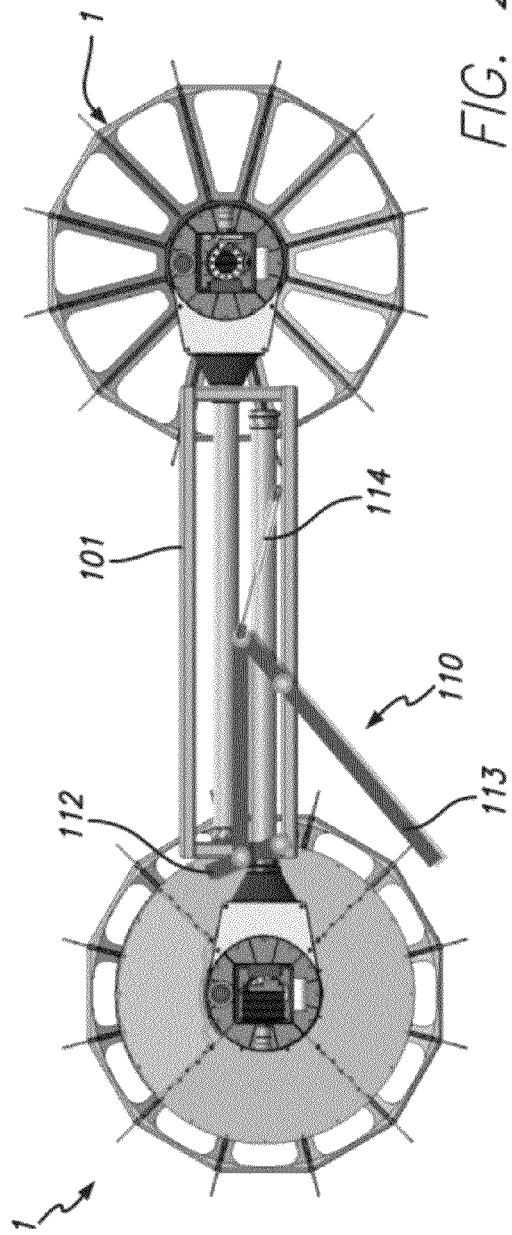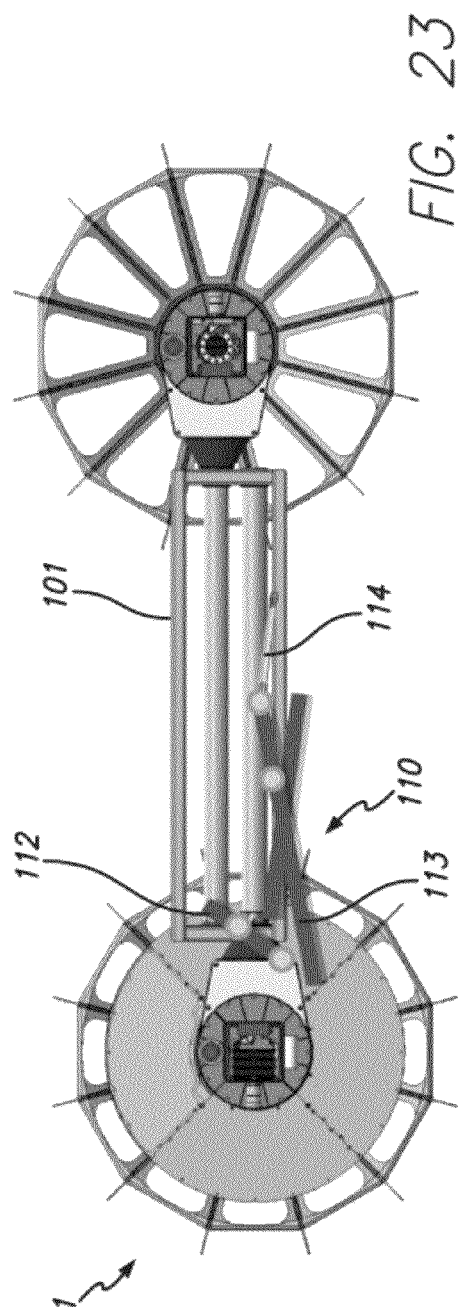

ROBOTIC TWO-WHEELED VEHICLE

STATEMENT OF GOVERNMENT GRANT

The invention described herein was made in the performance of work under a NASA contract, and is subject to the provisions of Public Law 96-517 (35 USC 202) in which the Contractor has elected to retain title.

FIELD

The present disclosure relates to robotic vehicles designed to access and explore terrains with extreme topographies, such as craters, canyons and gullies. Moreover, the present disclosure relates to robotic two-wheeled vehicles.

BACKGROUND

Robotic two-wheeled vehicles have been used to access and sample deposits from steep crater walls, or to collect and store terrain samples, and returning to its host platform for detailed scientific sample analyses.

SUMMARY

According to a first aspect of the disclosure, a robotic two-wheeled vehicle comprises a first wheel; a second wheel; a connection body, the connection body being interposed between the first wheel and the second wheel, the first wheel, the second wheel and the connection body being aligned along, and centered to, a longitudinal axis, wherein the connection body comprises a first drum coaxially located in a central region of the connection body, the first drum supporting a hollow arm projecting radially from the first drum; and a second drum coaxially located inside the first drum, the robotic two-wheeled vehicle further comprising a first actuator adapted to drive and rotate the first wheel; a second actuator adapted to drive and rotate the second wheel; a third actuator adapted to drive and rotate the first drum; and a fourth actuator adapted to drive and rotate the second drum, the first actuator, the second actuator, the third actuator and the fourth actuator being controlled independently of each other.

According to a second aspect of the disclosure, a robotic two-wheeled vehicle comprises a first wheel; a second wheel; and a connection body, the connection body being interposed between the first wheel and the second wheel, the first wheel, the second wheel and the connection body being aligned along, and centered to, a longitudinal axis, wherein the connection body comprises a first drum coaxially located in a central region of the connection body, the first drum supporting a hollow arm projecting radially from the first drum; and) a second drum coaxially located inside the first drum, wherein the first wheel and the second wheel each houses a case, the case accommodating one or more sensors and/or instruments.

According to a third aspect of the disclosure, a robotic two-wheeled vehicle comprises a first wheel; a second wheel; a connection body, the connection body being interposed between the first wheel and the second wheel, the first wheel, the second wheel and the connection body being aligned along, and centered to, a longitudinal axis, wherein the robotic two-wheeled vehicle comprises a mechanism for deploying one or more instruments and/or sensors from at least one of the first wheel and second wheel towards an external environment, one or more of the instruments and/or sensors being mounted on the mechanism, wherein the mechanism is associated to at least one of the first wheel and the second wheel.

According to a fourth aspect of the disclosure, a robotic two-wheeled vehicle comprises a first wheel; a second wheel; a connection body, the connection body being interposed between the first wheel and the second wheel, the first wheel, the second wheel and the connection body being aligned along, and centered to, a longitudinal axis, wherein the connection body comprises a first drum coaxially located in a central region of the connection body, the first drum supporting a hollow arm projecting radially from the first drum; and a second drum coaxially located inside the first drum; the robotic two-wheeled vehicle further comprising a first actuator and a second actuator, the first actuator connected to the first drum, and the second actuator connected to the second drum; and a tether housed in the hollow arm and fixedly connected to the second drum, wherein spinning the first drum in a first direction and spinning the second drum in a direction opposite the direction of rotation of the first drum, the tether is wound or unwound about the second drum, wherein spinning the first drum and the second drum in a same direction of rotation, the second drum rotates without reeling or unreeling the tether on the second drum, whereby the reeling and the unreeling of the tether is independent of motion of the first wheel and the second wheel.

According to a fifth aspect of the disclosure, a dual robotic two-wheeled vehicle comprises two robotic two-wheeled vehicles, each of the two robotic two-wheeled vehicles further comprising a first wheel; a second wheel; and a connection body, the connection body being interposed between the first wheel and the second wheel, the first wheel, the second wheel and the connection body being aligned along, and centered to, a longitudinal axis; a central module interposed between the two robotic two-wheeled vehicles; and a deploying mechanism associated with the central module to deploy an anchor when the robotic two-wheeled vehicle separates from the central module.

According to a sixth aspect of the disclosure, a dual robotic two-wheeled vehicle comprises two robotic two-wheeled vehicles, each of the two robotic two-wheeled vehicles further comprising a first wheel; a second wheel; and a connection body, the connection body being interposed between the first wheel and the second wheel, the first wheel, the second wheel and the connection body being aligned along, and centered to, a longitudinal axis; a central module interposed between the two robotic two-wheeled vehicles; and a joint to connect one or more robotic two-wheeled vehicle to the central module.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 9 shows a perspective view of a container of a robotic vehicle according to a further embodiment of the present disclosure.

FIG. 10 shows a perspective view of an instrument hub of a robotic vehicle according to a further embodiment of the present disclosure.

FIG. 13 shows a schematic cross sectional view of a portion of robotic two-wheeled vehicle according to an embodiment of the present disclosure.

FIGS. 22-23 show lateral views of dual robotic two-wheeled vehicles according to some embodiments of the present disclosure.

DETAILED DESCRIPTION

Figure 1:
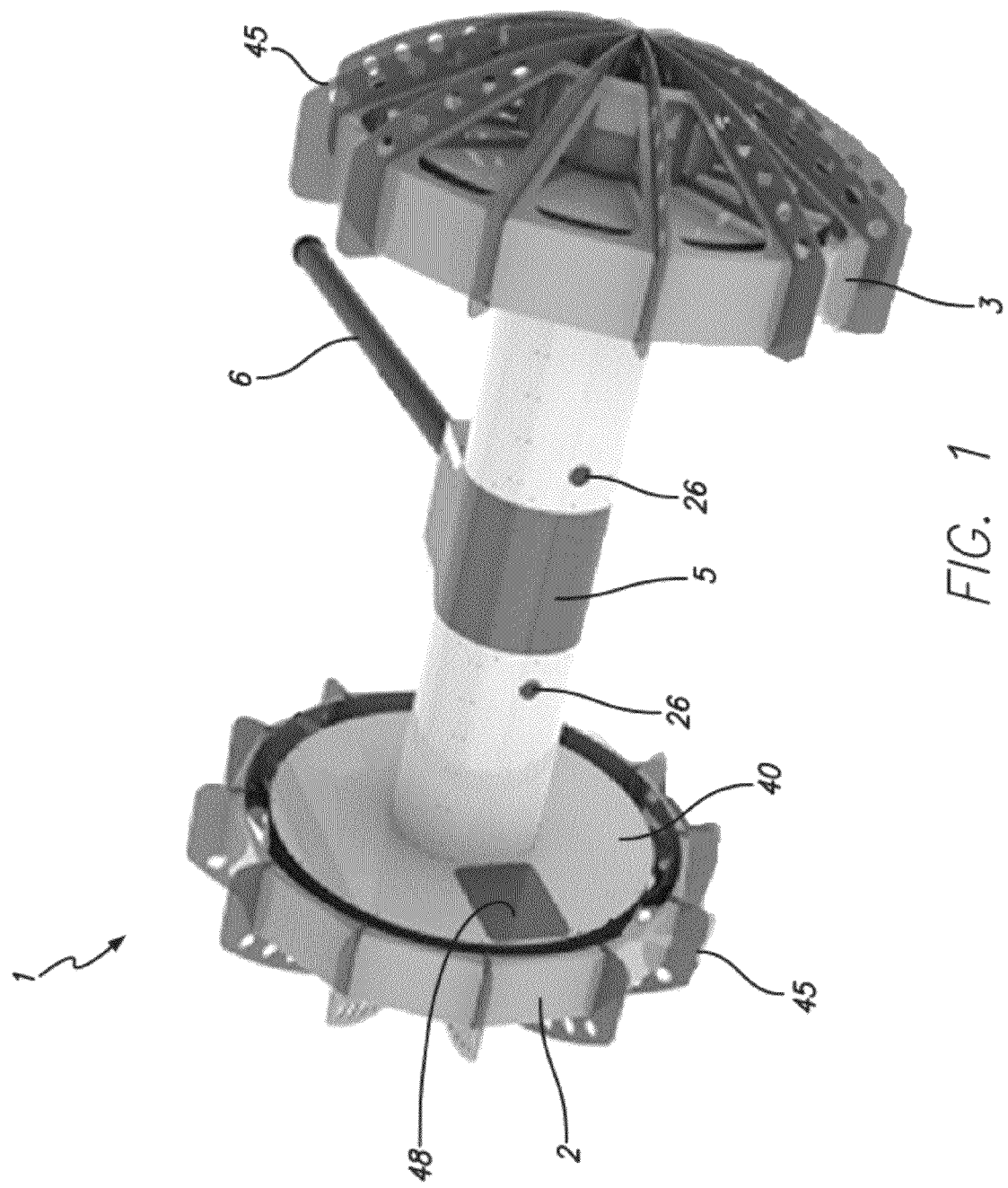
FIG. 1 shows a perspective view of a robotic two-wheeled vehicle according to an embodiment of the present disclosure.

Robotic two-wheeled vehicles can be tethered, wheeled vehicles operating fundamentally like a yo-yo, where the tether can be wrapped around a body of the two-wheeled vehicle. More in particular, the robotic two-wheeled vehicle can include two wheels connected by a connection body, a caster arm associated to the connection body, and an actively controlled tether passing through the caster arm. The caster arm, in addition to controlling the tether, can also provide a reaction force against the terrain necessary to generate forward motion when travelling on flat ground. In other words, the tether can be laid over the terrain as the rover descends, and then the tether can retracted as the rover returns to the host platform.

Robotic two-wheeled vehicles are disclosed, for example, in the following disclosures, all of which are incorporated herein by reference in their entirety:

I. A. D. Nesnas, P. Abad-Manterola, J. A. Edlund, J. W. Burdick, "The robotic two-wheeled vehicle 1 Mobility Platform for Steep Terrain Excursions on Planetary Surfaces," IEEE Aerospace Conference, Big Sky, Mont., March 2008;

P. Abad-Manterola, J. W. Burdick, I. A. D. Nesnas, J. Cecava, "Wheel Design and Tension Analysis for the Tethered The robotic two-wheeled vehicle 1 Rover on Extreme Terrain," IEEE Aerospace Conference, Big Sky, Mont., March 2009;

P. Abad-Manterola, J. W. Burdick, I. A. D. Nesnas, J. A. Edlund, A. Wu, T. Oliver, J. Cecava, "The robotic two-wheeled vehicle 1: A Minimalist Tethered Rover for Exploration of Extreme Planetary Terrains," IEEE Robotics and Automation Magazine, vol. 16, no. 4, pp. 44-52, December 2009;

P. Abad-Manterola. J. W. Burdick, I. A. D. Nesnas, S. Chinchali, C. Fuller, X. Zhou, "The robotic two-wheeled vehicle 1 Rover Paddle Wheel Design, Efficiency, and Sinkage on Deformable Terrain," IEEE Conference on Robotics and Automation, May 2010.

With reference to FIGS. 1-37, the present disclosure describes a robotic two-wheeled vehicle (1) and a dual robotic two-wheeled vehicle (100) which can include two robotic two-wheeled vehicles (1).

More in particular, with reference to FIGS. 1 and 6-8, the robotic two-wheeled vehicle (1) includes a first wheel (2), a second wheel (3) and a connection body (4), interposed between the first wheel (2) and the second wheel (3). In the example of FIGS. 1 and 6-8, the connection body (4) can have a substantially tubular body, and further having a substantially cylindrical shape. The first wheel (2), the second wheel (3) and the connection body (4) are aligned along, and centered to, a longitudinal X-axis (X).

Figure 35:
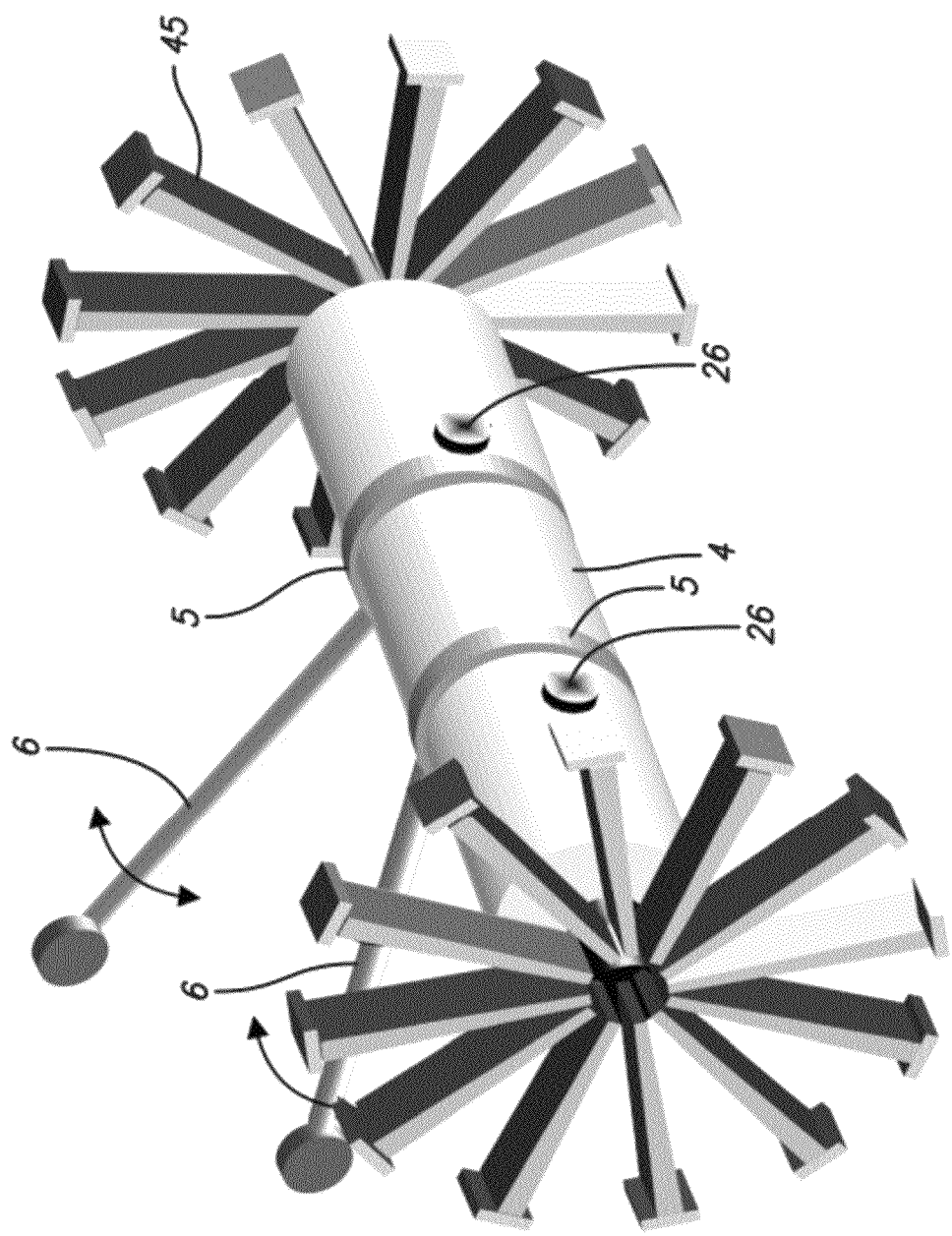
FIG. 35 shows a perspective view of a robotic two-wheeled vehicle according to an embodiment of the present disclosure.

The connection body (4) comprises a first drum (5). More in particular, the first drum (5) is an external mantel, which can be coaxially located in a central region of the connection body (4). The first drum (5) can be a sort of a ring or a sleeve, as shown in FIG. 1. An arm (6) is fixedly connected to the first drum (5). More in particular, the arm (6) can be a caster arm supported by the first drum (5) and projected radially from the first drum (5). The arm (6) is an elongated hollow or cannulated element which can be configured to house a tether (9). In particular, the tether (9) can pass through an elongated hole (7) of the arm. Referring to FIGS. 1 and 6-8, the robotic two-wheeled vehicle (1) is symmetrical with respect to a plane passing through the arm (6), and orthogonal to the X-axis (X). According to further embodiments, for example, as shown in FIG. 35, the connection body (4) can comprise two first drums (5), each supporting an arm (6).

The connection body (4) further includes a second drum (8), which is an internal drum or an internal spool, located inside the first drum. More in particular the second drum (8), is coaxially located in a central region of the connection body (4). It follows that the second drum (8) is coaxially accommodated within the first drum (5). The tether (9) is fixed to the second drum (8), and extends through the arm (6) towards an external environment.

According to some embodiments of the present disclosure, the robotic two-wheeled vehicle (1) can include a first actuator (11), which can be adapted to drive and rotate the first wheel (2), a second actuator (12), which can be adapted to drive and rotate the second wheel (3), a third actuator (13), which can be adapted to drive and rotate the first drum (5), and a fourth actuator (14), which can be adapted to drive and rotate the second drum (8). The first actuator (11), the second actuator (12), the third actuator (14) and the fourth actuator (14), all rotate the first wheel (1), second wheel (2), first drum (5) and second drum (8), respectively, around the longitudinal X-axis (X).

In addition, according to one embodiment of the present disclosure, the first actuator (11), the second actuator (12), the third actuator (14) and the fourth actuator (14) are all independently controlled from each other, and can be activated individually to obtain high maneuverability of the robotic two-wheeled vehicle (1), as described, for example, in the following paragraphs.

Figure 6:
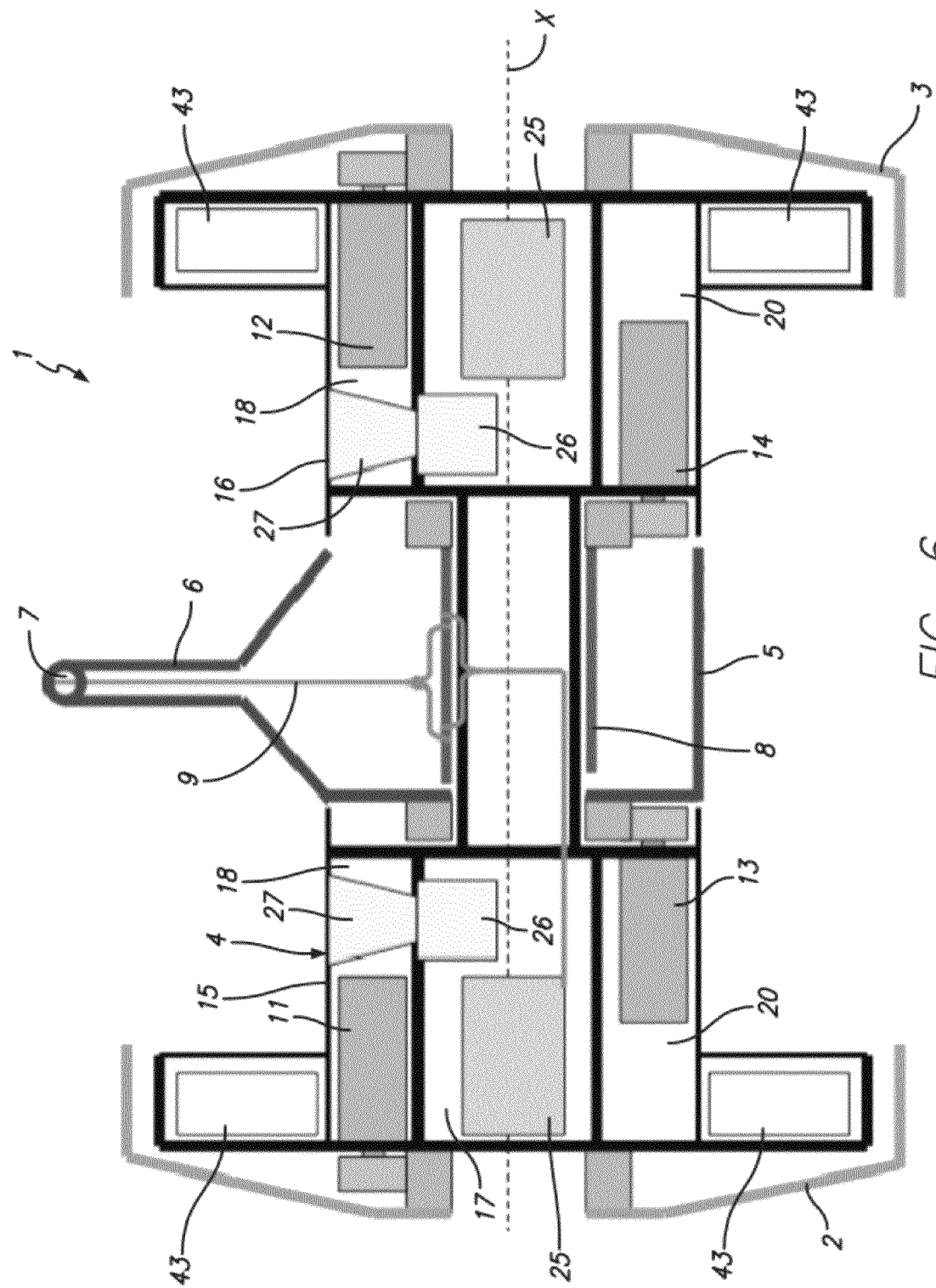
FIG. 6 shows a schematic cross sectional view of a robotic two-wheeled vehicle according to an embodiment of the present disclosure.

With reference to FIG. 6, the robotic two-wheeled vehicle (1) includes two containers (15)(16) (e.g., cylindrically-shaped containers), which are part of the connection body (4). More in particular, a first container (15) can be located in the connection body (4) between the first wheel (2) and the central region accommodating the first and second drums (5)(8), and a second container (16) is located in the connection body (4) between the second wheel (3) and the central region accommodating the first and second drums (5)(8). One of the two containers (15)(16) is illustrated in detail in FIG. 9. Each container (15)(16) includes internal transversal walls (22) which carry a structural load between the central drums (5)(8) and the wheels (2)(3).

In particular each container (15)(16) can include five compartments such that one compartment is a central (quadrant) compartment (17), and four peripheral compartments (18)(19)(20)(21), angularly distributed around the central compartment along the circumference of the container (15)(16), for example, between the central compartment (17) and the circumference of the container (15)(16). The walls (22) mentioned above are further provided to separate the compartments (17)(18)(19)(20)(21) among each other. Such compartments (17)(18)(19)(20)(21) house batteries (23), motors, e.g., the above mentioned actuators (11)(12)(13)(14), avionics and other circuits.

More in particular, in the embodiment of FIGS. 6 and 9, a first peripheral compartment (18) of the first container (15) (which corresponds to the upper compartment shown in FIG. 6) houses the first actuator (11), and a second peripheral compartment (20) of the first container (15) (which corresponds to the lower compartment shown in FIG. 6) houses the third actuator (13), whereby the second peripheral compartment (20) is the peripheral compartment opposite the first peripheral compartment (18). The central compartment (17) of the first container (15) can house avionics (25) and a camera (26) or a camcorder. The camera (26) include a lens housing (27) or a zoom lens, which can be inserted through a through-hole passing through the first peripheral compartment (18) and exposed to the external environment.

The first peripheral compartment (18) of the second container (16) (which corresponds to the upper compartment shown in FIG. 6) houses the second actuator (12) and the second peripheral compartment (20) of the second container (16) (which corresponds to the lower compartment shown in FIG. 6) houses the fourth actuator (14), the second peripheral compartment (20) being opposite to the first peripheral compartment (18). The central compartment (17) of the second container (16) can house avionics (25) and a camera (26) or a camcorder. The camera (26) can include a lens housing (27), or a zoom lens, which can be inserted through a through-hole passing through the first peripheral compartment (18) and exposed to the external environment.

The two cameras (26) are included in the connection body (4) laterally to the first drum (5) and the second drum (8). More in particular, the two cameras (26) can be arranged in a stereo configuration, thereby enabling the robotic two-wheeled vehicle (1) to acquire stereo images and generate three-dimensional maps of its surrounding. To obtain stereo images the two cameras (26) are aligned in parallel to each other. It follows that according to some embodiments of the present disclosure, the connection body (4) houses and protects all of its hardware and electronic components.

According to further aspects of the present disclosure, each actuator (11)(12)(13)(14) includes a motor (30), a brake (31), an encoder (32), and a gearbox (33), including output gear stage (34) (3 or 4 stage planetary) and gear reduction (35). In particular, all four actuators use the same components except that the gear ratios between the motors that drive the wheels are different from the gear ratios of motors that drive the arm (6) and the spool, or the second drum (8). The wheel actuators (11) (12) have a higher gear ratio than the other two motors. More in particular, as to the first actuator (11) and the second actuator (12), the gear reduction (35) of each first actuator (11) and second actuator (12) projects outside the respective first or second containers (15)(16) of the connection body (14), to mesh or engage with corresponding teeth of the respective first wheel (2) and second wheel (3). As to the third actuator (13), the gear reduction (35) of the third actuator (13) projects outside the peripheral compartment (20) of the container (15) to mesh or engage with corresponding teeth of the second drum (8). As to the fourth actuator (14), the gear reduction (35) of the fourth actuator (14) projects outside the peripheral compartment (20) of the container (16) to mesh or engage with corresponding teeth of the second drum (8).

According to further aspects of the present disclosure, the robotic two-wheeled vehicle (1) can include one or two instrument/sensor cases, hubs or bays (40). In particular, at least one, or both the first wheel (2) and the second wheel (3) can be concave/convex, substantially cup-shaped or substantially hemispheric, such that a recess (41) of the wheel faces towards the connection body (4). At least one recess (41) can house one instrument/sensor case, hub or bay (40). More in particular, these instrument cases (40) can house a suite of instruments (43) or sensors (47) that the robotic two-wheeled vehicle (1) can use for detection and elemental analysis. Each case (40) can carry three or four instruments (43) or sensors (47). The instrument cases (40) can also include devices to collect rock and dirt samples. Small drills and corers can be mounted and deployed from the instrument cases (40).

Figure 7:
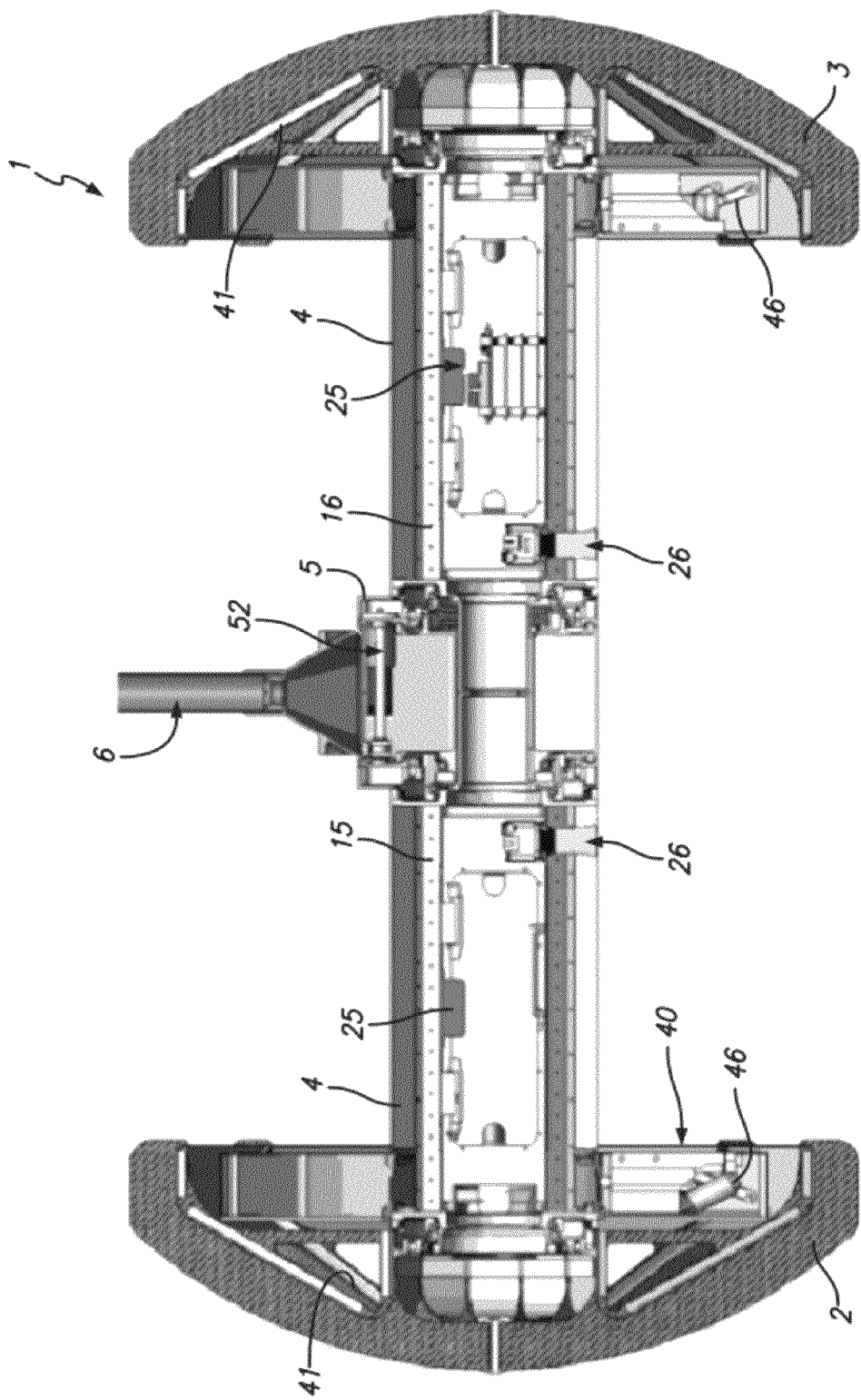
FIG. 7 shows a schematic cross sectional view of a robotic two-wheeled vehicle according to an embodiment of the present disclosure.
Figure 8:
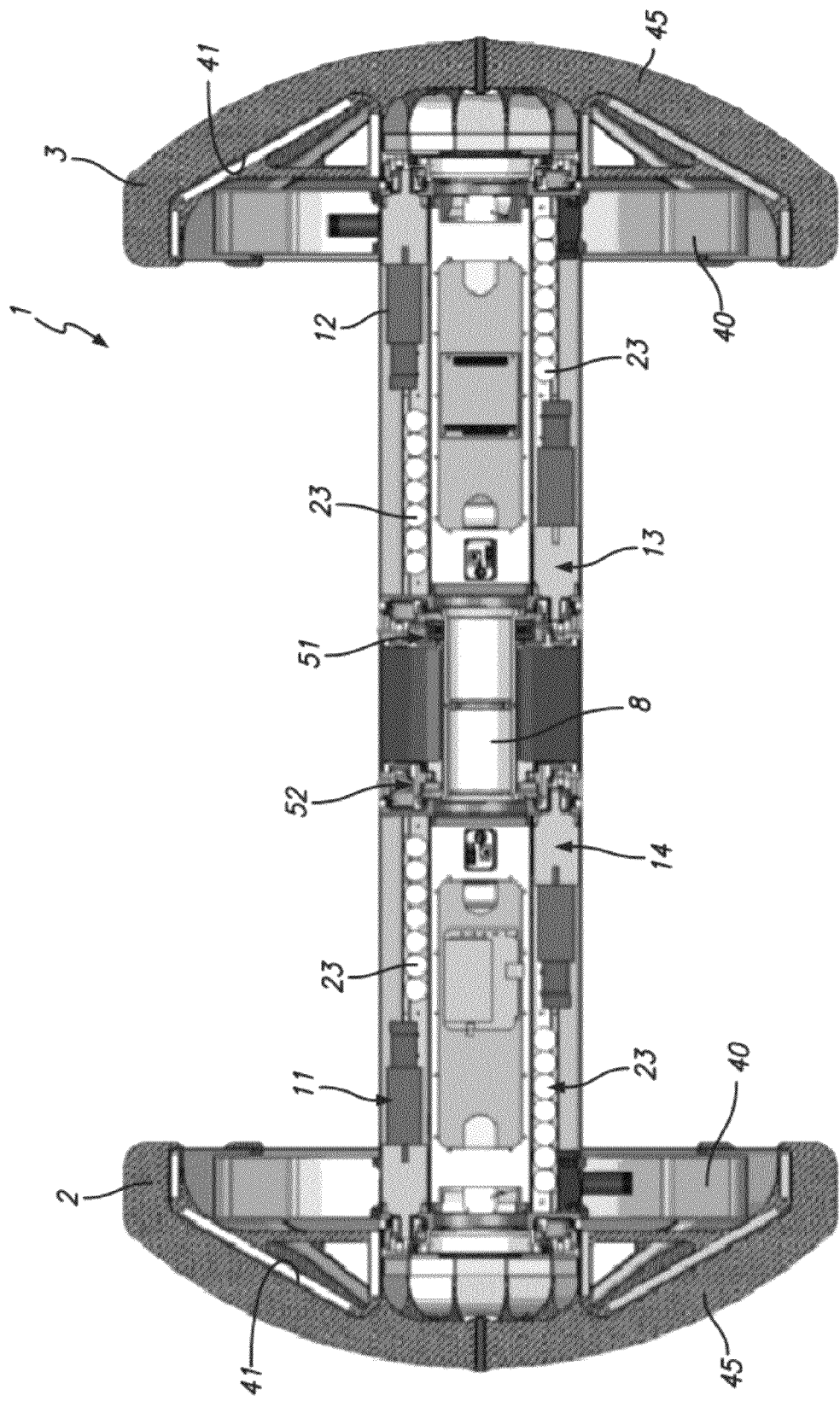
FIG. 8 shows a schematic cross sectional view of a robotic two-wheeled vehicle according to an embodiment of the present disclosure.
Figure 12:
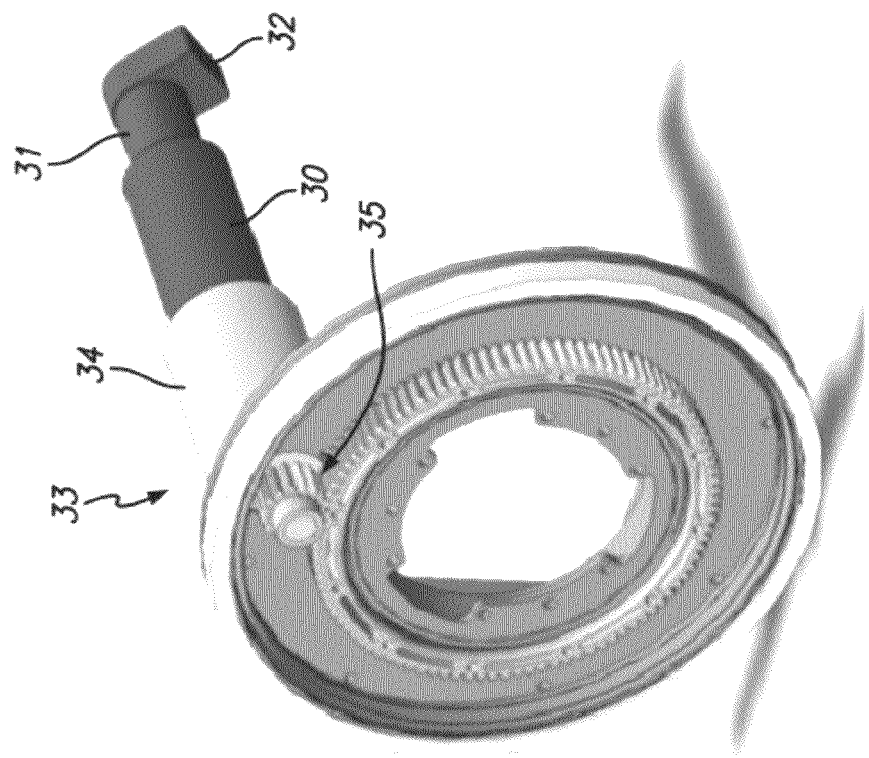
FIG. 12 shows a perspective view of an actuator for a robotic vehicle according to a further embodiment of the present disclosure.
Figure 11:
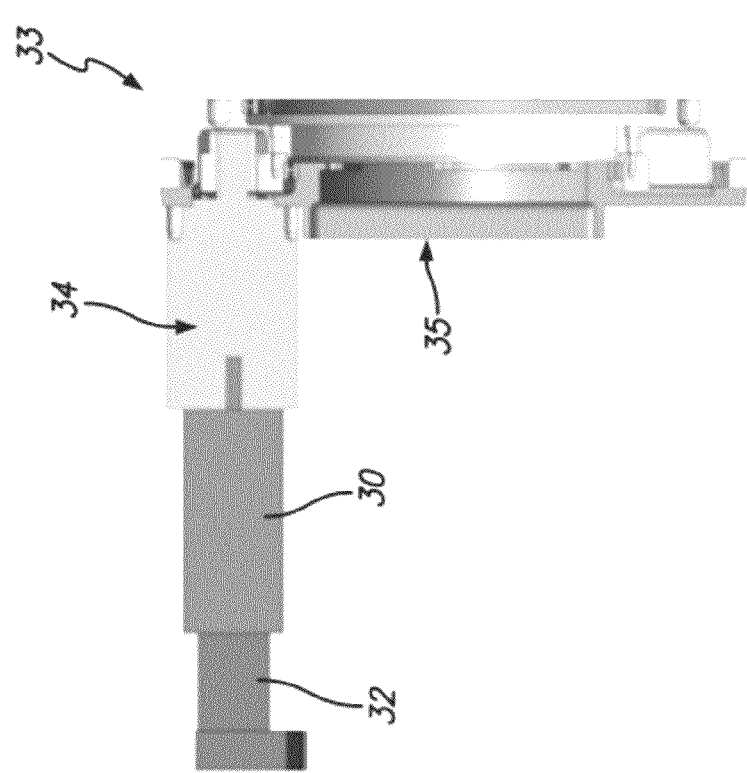
FIG. 11 shows a lateral view of an actuator for a robotic vehicle according to a further embodiment of the present disclosure.

In the embodiment of FIGS. 7-8 and 10, the bay (40) can be a hub or a cylindrical casing with a through hole (44) in the middle. When the bay (40) is located in the recess (41), the output gear stage (34) of the gearbox (33) of the first actuator can be inserted in the through hole (44).

A similar configuration is provided for the bay (40), which can be housed in the recess (41) of the second wheel (2). It follows that in the embodiment shown in the FIGS. 7-8, bays (40) or large cylinders can be mounted on either end of connection body (4). Each of the instrument bays (40) are fixed to the respective first container (15) and second container (16), such that the instrument bays (40) can rotate with the connection body (4). Therefore, the instrument bays (40) and the respective first and second wheels (2)(3) can be rotated independently.

Figure 34:
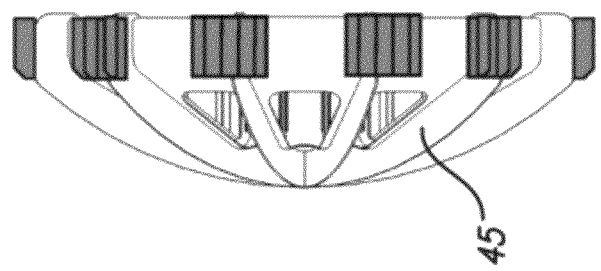
FIGS. 33-34 show views of wheels for robotic two-wheeled vehicles according to some embodiments of the present disclosure.
Figure 33:
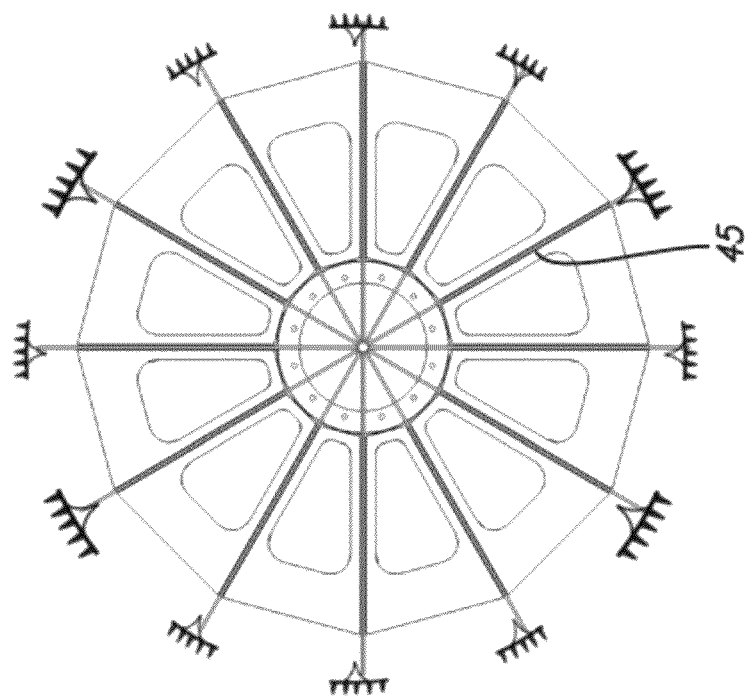
Figure 37:
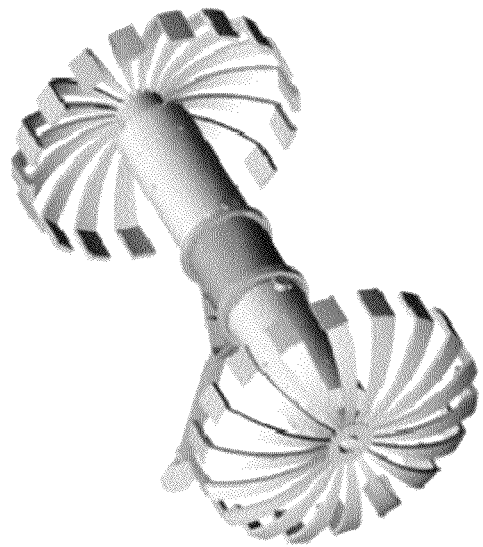
FIGS. 36 and 37 show perspective views of robotic two-wheeled vehicles according to some embodiments of the present disclosure.
Figure 36:
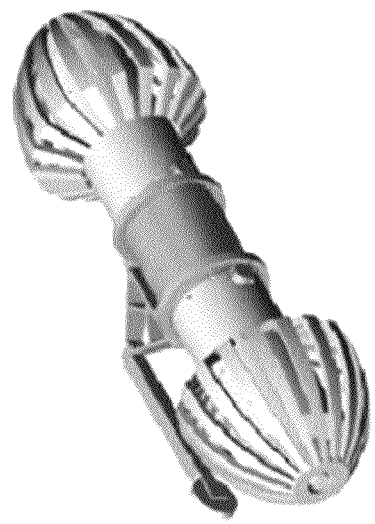

More in particular, according to some embodiments, both the first wheel (2) and the second wheel (3) can include large grousers (45), radially formed from the center of each wheel (2)(3). Each group of grousers (45) or paddles enable the robotic two-wheeled vehicle (1) to overcome obstacles having a height that can be equivalent to the radius of the wheel. It follows that the instrument bays (40) mounted and attached to either side of connection body (4), can be protected by the cantilevered wheels. In addition, according to further embodiments, the grousers can be different types and geometry, as shown in FIGS. 33, 34, 36 and 37. By way of example and not of limitation, the grouser can be a T-shaped grouser, as shown in FIG. 34. In addition, as shown in FIGS. 36 and 37, the grousers can be foldable towards the connection body (4).

Figure 19:
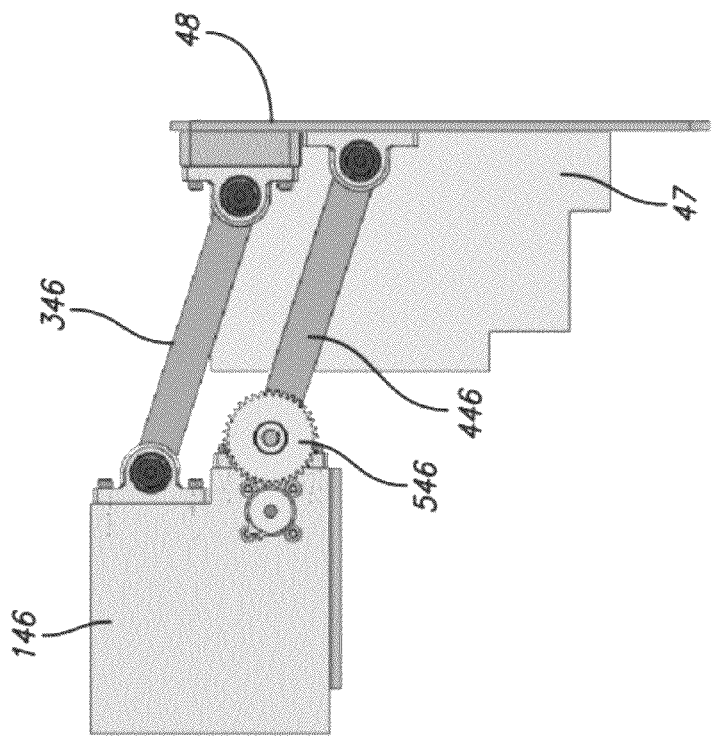
FIGS. 18-21 show perspective views of four-bar mechanisms for robotic two-wheeled vehicles according to some embodiments of the present disclosure in different configurations.
Figure 18:
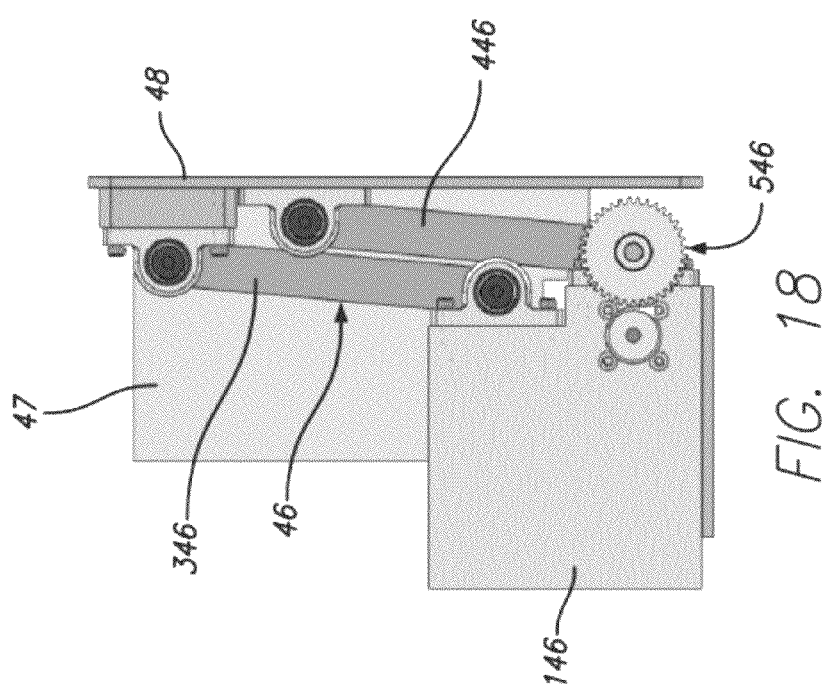
Figure 21:
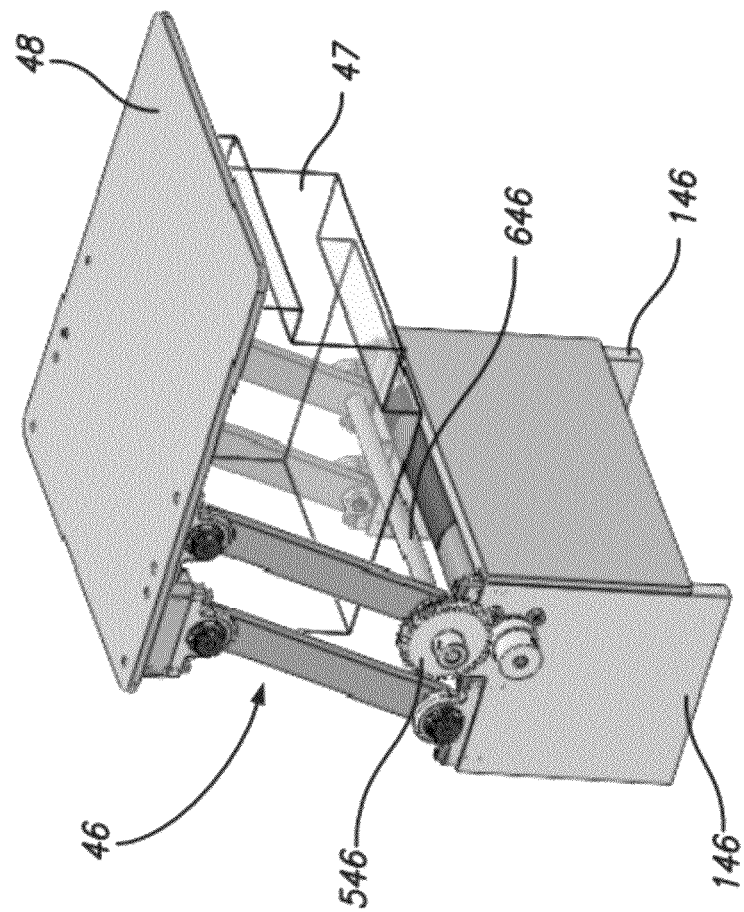
Figure 20:
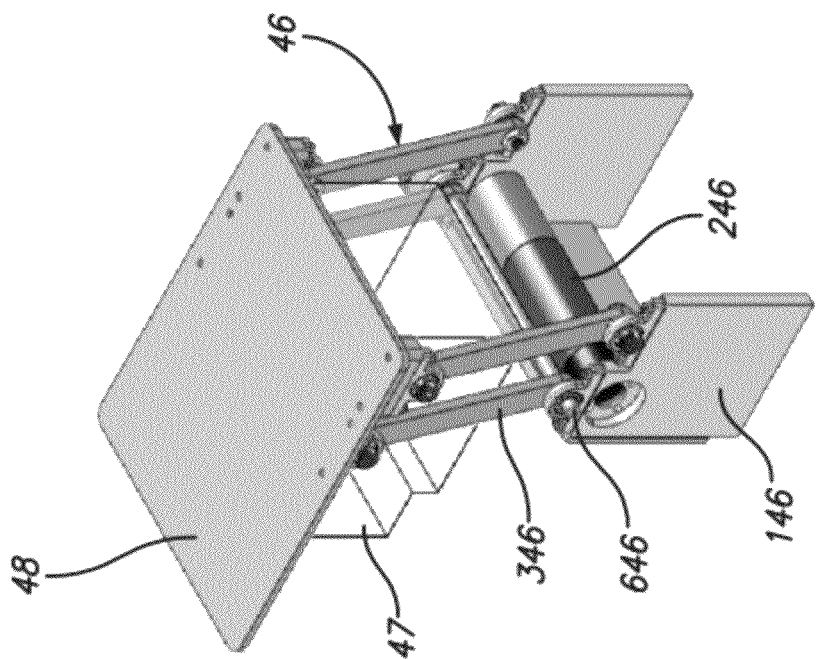
Figure 24:
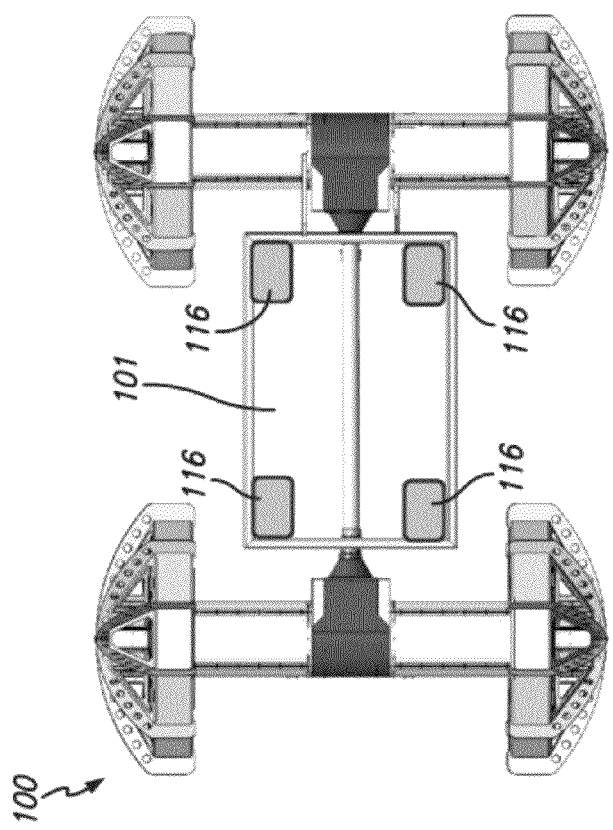
FIG. 24 shows a bottom view of a dual robotic two-wheeled vehicle according to an embodiment of the present disclosure.
Figure 25:
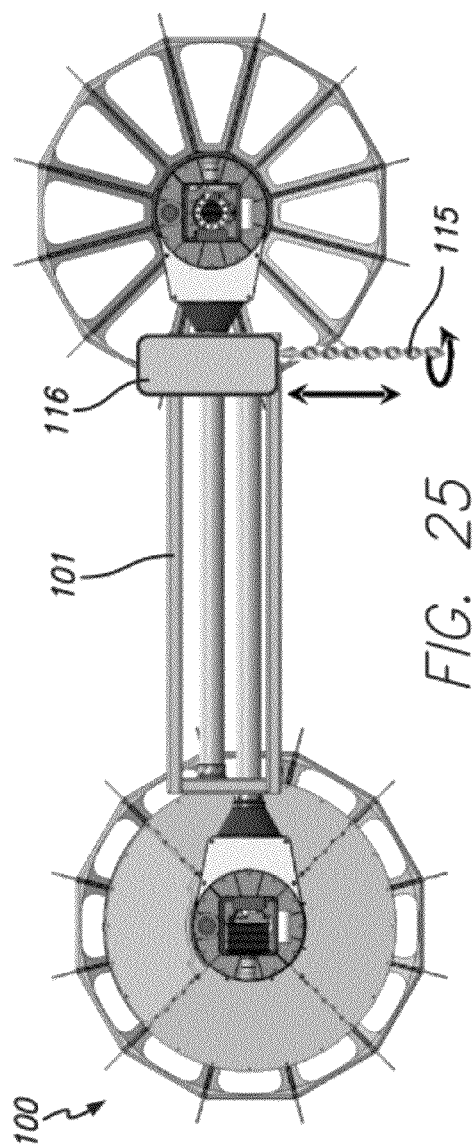
FIG. 25 shows a lateral view of a dual robotic two-wheeled vehicle according to an embodiment of the present disclosure.

According to further embodiments of the present disclosure, each bay (40) can further accommodate multiple instruments, which can be deployed to conduct in-situ contact measurements or sampling mechanisms. For example, contact instruments inside the bays (40) can be mounted on a single degree-of-freedom four-bar mechanism (46) that can deploy the contact instrument head, as indicated by an arrow in FIG. 6. Thus, for instruments that are configured to come in contact with the ground, the bays (40) can use a single axis four-bar mechanism to deploy and retract their sensor heads (47). In cases where only the instrument detector needs to be moved, the rest of the instrument (43) can remain inside the instrument bay (40) without motion. Sample collection mechanism can include a single scoop deployed using a four-bar mechanism, a drill or a corer with an array of sample canisters stored inside the bay (40). FIGS. 10, 18 and 19 show a single instrument head (47) mounted on a mechanism (46) to be deployed. The instrument head (47) of FIGS. 18 and 19 is schematically illustrated as a closed box or case. The head (47) can be mounted on a portion (48) or a panel cut out from the bay (40). It follows that the single degree-of-freedom four-bar mechanism (46) can act as secondary actuators for the instruments.

In particular, with reference to FIGS. 18 and 19, the mechanism (46) can include a pair of supporting members (146), a first set of two parallel bars (346) and a second set of two parallel bars (446). The supporting members (146) are spaced apart at a set distance from each other. The supporting members (146) can be fixedly connected to the respective instrument bay (40). A first end of the first set of parallel bars (346) can be pivotally hinged to the portion (48) and, a second end of the first set of two parallel bars can be pivotally hinged to the respective supporting member (146). A first end of the second set of parallel bars (446) can also be pivotally hinged to the portion (48) and, a second end of the second set of two parallel bars can be connected with a rotating shaft (646), which can be rigidly fixed to a driving wheel of a gear (546). In particular, the rotating shaft (646) can be located in an eccentric position to the center of the driving wheel.

The gear (546) is driven by a mechanism actuator (246) located between the supporting members (146). Based on the connections between the portion (48), the supporting members (146), the four bars comprising the first and second sets of parallel bars (346) (446), the gear (546) and the rotating shaft (646) described above, and the actuation of the gear (546) creates a rotary translation movement of the head (47) out of the instrument bay (40). The head (47) initially moves in a lateral direction (e.g., towards the opposite instrument bay, to the right in FIGS. 18 and 19), and then moves in a vertical direction downwards, towards the ground.

Each instrument bay (40) can carry more than one instrument, and more than one four-bars mechanism (46). It should be noted that because the robotic two-wheeled vehicle (1) has a separate spool (second drum (8)) and arm actuators (first drum (5)), it can point any instrument at any angle against the terrain. Such pointing is independent of the ascent and descent motion of the robotic two-wheeled vehicle (1) on steep slopes. In other words, the robotic two-wheeled vehicle (1) can orient and point its instruments while hanging from the tether. The re-pointing of the instruments, thereby moving both the spool and arm motors, will not necessarily move the robotic two-wheeled vehicle (1) up or down, but instead just orient the instruments.

Figure 17:
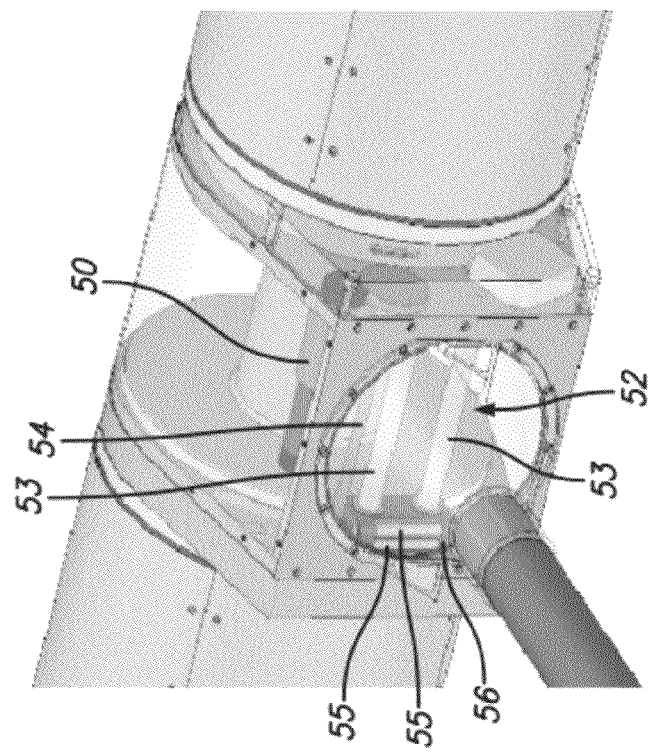
FIG. 17 shows a perspective view of a portion of robotic two-wheeled vehicle according to an embodiment of the present disclosure.
Figure 16:
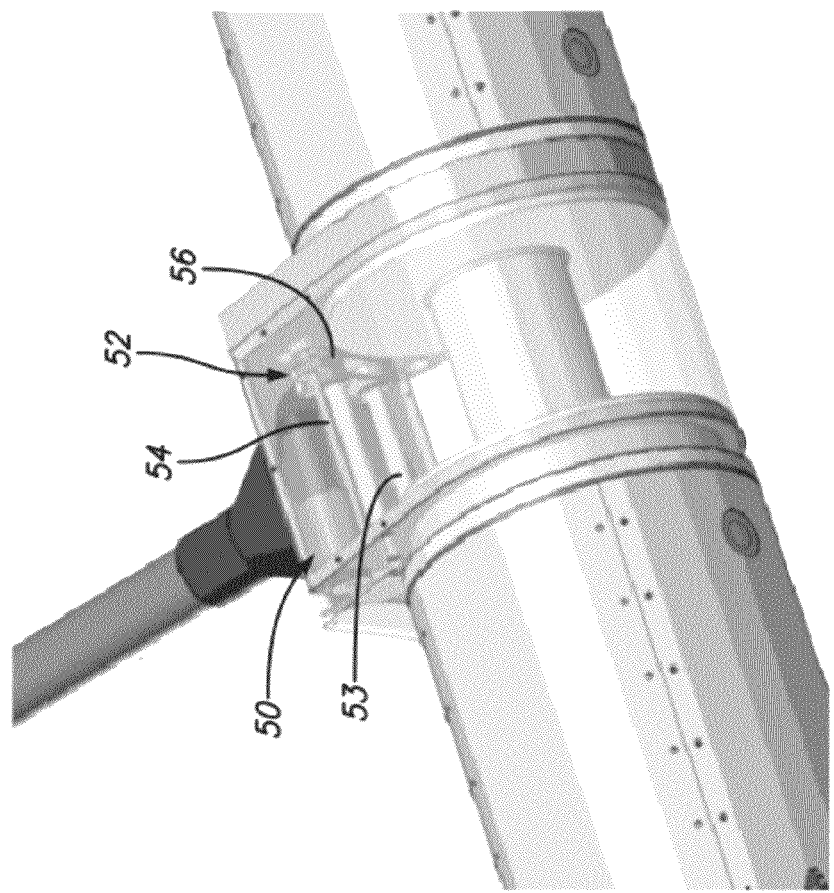
FIG. 16 shows a perspective view of a portion of robotic two-wheeled vehicle according to an embodiment of the present disclosure.

According to further embodiments, for very long traverses, in addition to the four primary actuators (e.g., first, second, third and fourth actuators (11)(12)(13)(14)) and the instruments' secondary actuator (e.g., the single degree-of-freedom four-bar mechanisms (46)), an optional fifth actuator (50) can be used for level winding mechanism (52) of the tether (9) onto the second drum (8) as shown in FIGS. 16 and 17. In particular, such level winding mechanism (52) can include two pairs of parallel rollers (53) (55) included in the first drum (5), between the arm (6) and the second drum (8). The rollers (53) (55) can be driven and rotated around respective axes by the fifth actuator (50). In particular the two roller pairs can include a horizontal roller pair (53) and a vertical roller pair (55). The vertical rollers (55) can be mounted on a vertical roller mechanism (56) that can slide horizontally over the horizontal rollers (53). The horizontal rollers (53) can be parallel to the second drum (8). The movement of the vertical roller mechanism (56) can be controlled by a ball-screw mechanism (54), that is shown as a thin cylinder in FIG. 16, and geared to the fifth actuator (50). By rotating the screw (54), the vertical roller mechanism (56) can slide horizontally back and forth to wind the tether on the second drum (8). The tether (9) can run between the vertical rollers (55) and the horizontal rollers (53) to orderly wind the tether around the second drum (8). It follows that the level winding mechanism (52) can be adapted to maximize the amount of tether that is wrapped on the spool and to separate tension between the first drum (5) and the exterior of the first drum (8).

Since the fifth actuator (50) can be mounted on the first drum (5) that moves relative to the connection body (4), electrical signals can passed through a commutation ring (51) between the connection body (4) and the first drum (5) as depicted in FIG. 13 (slip rings).

Figure 15:
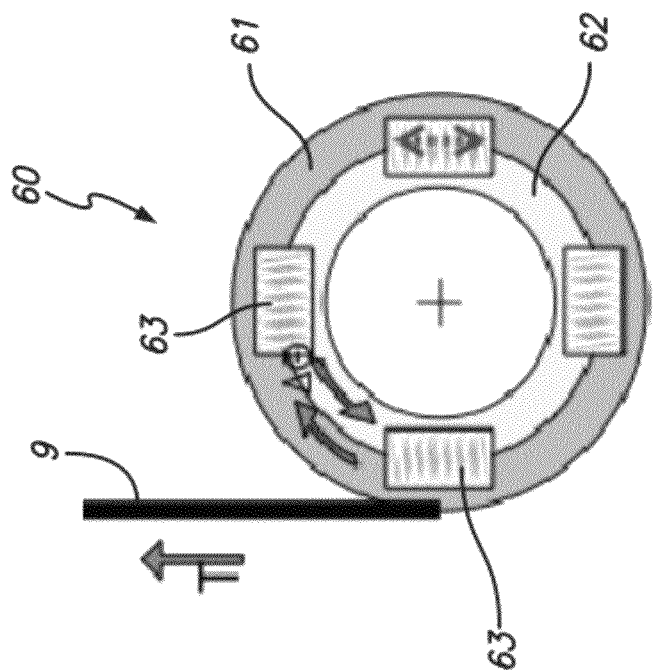
FIG. 15 shows a schematic partial cross sectional view of a portion of robotic two-wheeled vehicle according to an embodiment of the present disclosure.
Figure 14:
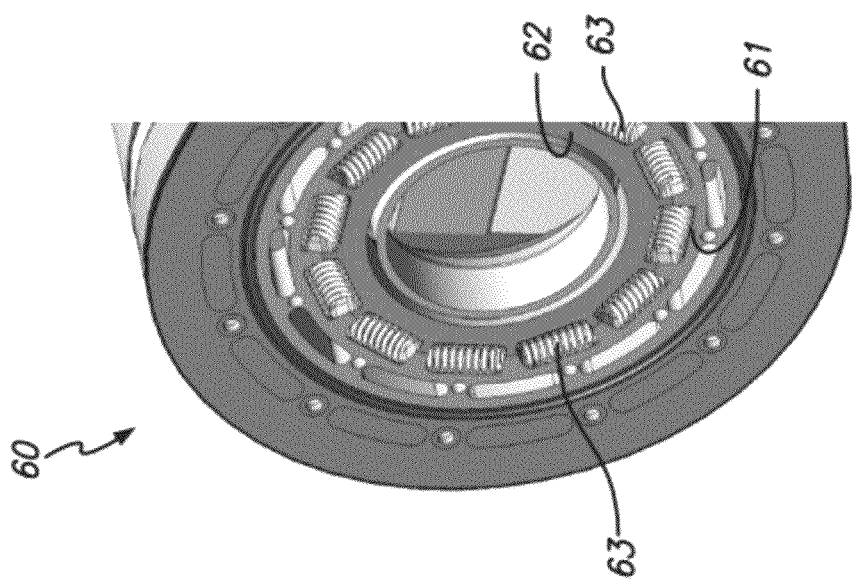
FIG. 14 shows a schematic cross sectional view of a portion of robotic two-wheeled vehicle according to an embodiment of the present disclosure.

With reference to FIGS. 14 and 15, the vehicle (1) can include a tether tension sensor (60) of the second drum (8). The tether tension sensor (60) is based on automotive clutch plate concept. A plate (61) can be attached to the spool actuator, e.g., the fourth actuator (14). A second plate (62) can be connected to the first plate (61) by way of stiff springs (63) as shown in FIGS. 13-15, which can be also be attached to the spool or second drum (8). As the tension of the tether (9) increases, the plate (62) attached to the second drum (8) spool can move, thereby pressing against the springs (63) that connects it to the spool drive actuator (14) or the fourth actuator. The displacement between the two plates (61) (62) can be measured using a high resolution absolute encoder, wherein one side is connect to the spool side plate (62) and the other to the actuator side plate (61). The tension of tether (9) can be determined by calculating the spring constant and the relative angle between the plates by using an absolute encoder. In addition, because the tether (9) and the spool or the second drum (8) are connected to the spool's actuator (14) using a spring (63), a sudden rise in tether tension (which can result from a sudden fall of the robotic two-wheeled vehicle (1)) can be, in part, absorbed by the spring (63). Such resilience can contribute to the material resiliency of the tether to help reduce the effects of dynamic shock loads, thus reducing risk of breaking the tether.

Figure 3:
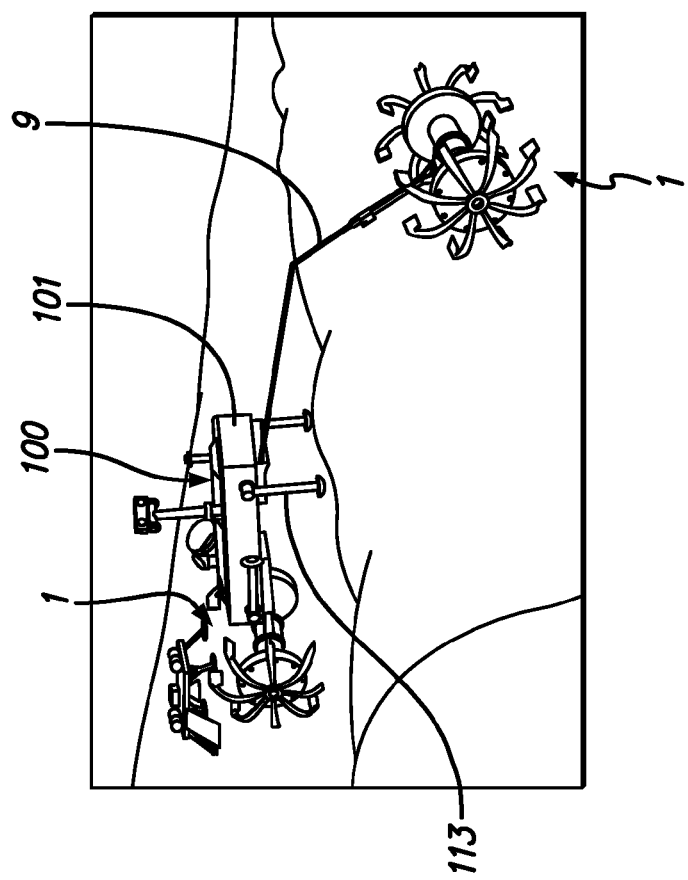
FIG. 3 shows a perspective view of a robotic vehicle according to an embodiment of the present disclosure.
Figure 2:
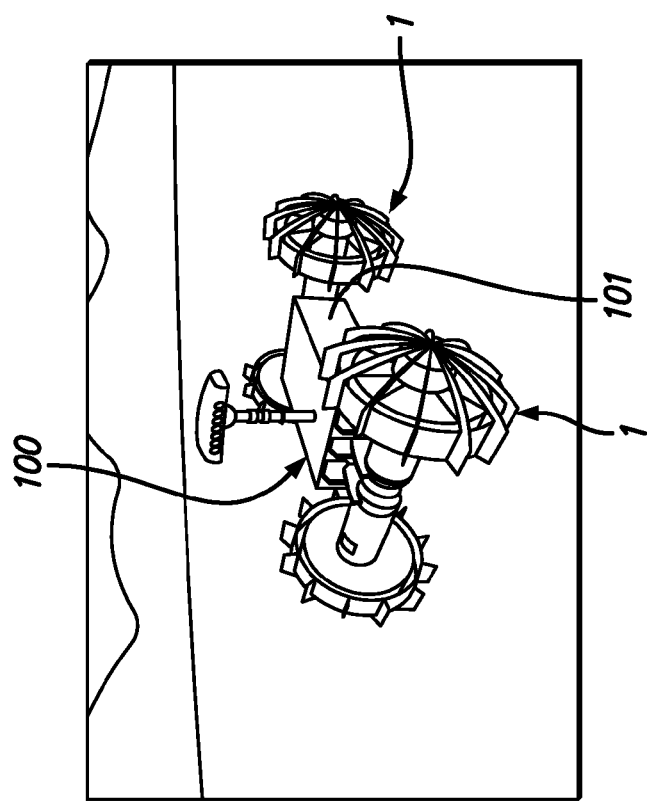
FIG. 2 shows a perspective view of a robotic vehicle according to an embodiment of the present disclosure.

With reference to FIGS. 2 and 3, a further robotic vehicle (100) is shown, which is a dual two-wheeled vehicle (e.g., two two-wheeled vehicles (1) as described in the previous paragraphs). The robotic vehicle (100) further includes a central module (101) that connects the two two-wheeled vehicles (1) together. Each of the two-wheeled vehicles (1) can operate independently from each other. It follows that the robotic vehicle (100) is a four-wheeled vehicle formed by connecting two two-wheeled vehicles (1) to either side of a central module as shown in FIG. 2. In the robotic vehicle (100), tethers (9) of both two-wheeled vehicles (1) are permanently attached to the central module (101). The tethers (9) not only provide mechanical support to each two-wheeled vehicle (1), but they also provide a wired connection for power and communication. The central module (101) trickle charges the two-wheeled vehicle's batteries using a small gauge wire and also relays communication from two-wheeled vehicle (1) to a central control station. In case of planetary applications, the central module (101) relays such information to Earth.

The central module (101) has either passively or actively deployed legs or augers (drills) to anchor the central module (101) during the disengaging of a single robotic two-wheeled vehicle (1) from the central module (101). In particular, to keep the central module (101) parallel to the ground following the separation of the robotic two-wheeled vehicle (1) from the dual robotic two-wheeled vehicle (1), a deploying mechanism can be used to deploy an anchor. Such anchors (113) (115) are shown in FIGS. 22-25 and in FIGS. 3 and 4, and they can be either passive or active. A passive mechanism (110) relies on the robotic two-wheeled vehicle's motion as it separates from the dual two-wheeled vehicle (1) to deploy and retract. More in particular, as the robotic two-wheeled vehicle (1) drives out of the central module (101), it moves a cam or a four-bar mechanism plate (112) to release an anchor plate (113) on a side opposite of the undocking robotic two-wheeled vehicle (1).

The anchor plate or legs (113) can be held in place using a brake or a spring (114). When the robotic two-wheeled vehicle (1) re-docks to the central module, it reverses the process by lifting up the anchor plate or the legs (113). Alternatively to the passive leg/anchor deployment method can be active deployment, which is shown for example in FIGS. 24-25. Such active deployment device can use a mechanism (116) that is independently actuated with respect to an actuation of the robotic two-wheeled vehicle (1). According to one embodiment, the active mechanism (116) can activate percussive drills (115) that are perpendicular to the central module (101). Two such mechanisms (116) including the percussive drills (115) can be mounted on each end of the central module (101). Each mechanism (116) can include a drill bit/auger and a mechanism that rotates and feeds the drill into the ground (not shown). Once two drills (115) are anchored into the ground, the robotic two-wheeled vehicle (1) can separate from the dual robotic two-wheeled vehicle (1). Alternatively, according to further embodiments, the percussive drills can be tilted at a slight angle from perpendicular direction. Alternatively, according to further embodiments, instead of a rotary percussive drill, the active mechanism (116) can include a bit which moves in a linear motion to anchor/de-anchor the central module (101).

The robotic two-wheeled vehicle (1) of the present disclosure can operate in different manners and movements, and as already described above, is capable of high maneuverability and provides a plurality of operational modes. In particular, according to some embodiments of the disclosure, the robotic two-wheeled vehicle (1) can operate with, or without a tether (9). Without the use of a tether (9), or further, in the absence of a tether (9), the robotic two-wheeled vehicle (1) is capable of traversing flat, rocky and moderately sloped terrains. It can traverse rocks substantially high as the height of the radius of the wheel. In particular, each wheel (2)(3), as disclosed above, can be independently controlled by its own actuator (11)(12), and enables the robotic two-wheeled vehicle (1) to move forward, backward, turn left and turn right, thereby follow arbitrary paths and geometries. The robotic two-wheeled vehicle (1) can turn in place by driving the wheels (2)(3) in opposite directions. In other words, using four actuators, the robotic two-wheeled vehicle (1) is capable of following arbitrary paths, turning in place, and operating upside-down or right-side up.

In other embodiments, the vehicle uses the tether (9) that runs through the arm (6) associated with the first drum (5). In such embodiments, the robotic two-wheeled vehicle (1) can move down very steep terrains. In fact, with the tether (9), the robotic two-wheeled vehicle (1) does not need a surface to rest on. As already mentioned above, the tether (9) is wrapped around the second drum (8). To wind the tether (9) around the second drum (8), the fourth actuator (14) rotates or spins the respective first drum (5) and the second drum (8), thereby moving the robotic two-wheeled vehicle (1) up or down without changing its pitch. More in particular, by spinning the first drum (5) and the second drum (8) in opposite directions, twice the power can be applied to reeling in the tether (9). This will cause the pitch of the robotic two-wheeled vehicle (1) to change as the robotic two-wheeled vehicle (1) moves. In addition to controlling the pitch during ascent and descent, this provides redundancy in case of a failure of either motor. In other embodiments, by spinning the first drum (5) and the second drum (8) in the same direction of rotation, the second drum (8) can rotate without reeling in the tether (9). Thus, the tether (9) does not wrap around the second drum (8). Due the driving/actuation of the second drum (8) or spool, independently of the first drum (5) and the first and second wheels (2)(3), it is possible to control the pitch of the vehicle while reeling and unreeling of the tether (9), both during motion of the vehicle (1) and/or independently of the motion of the first wheel (2) and the second wheel (3).

Further movements of the robotic two-wheeled vehicle (1) can be as follows. In particular, the first and second wheels (11)(12) can be oriented (right-side or left-side) by activating just one of the first and second actuators (11)(12). In such case, the robotic two-wheeled vehicle (1) can rotate around a vertical axis. It should be noted that instruments in the bay (40), as well as the instruments inside the connection body (4) (e.g., stereo cameras (26)) can be oriented independent of the arm (6) and tether winding since the latter component is independently actuated.

In addition, the third actuator (13), which, as mentioned above, independently controls the first drum (5), allows the first drum (5) to rotate 360 degrees around the connection body (4). The independent actuation of the first drum (5) can serve multiple purposes:

(1) The first drum (5) can provide a reaction lever arm (6) against wheel thrust to move the robotic two-wheeled vehicle (1).

(2) When combined with the motion of the wheels (2)(3), the first drum (5) controls the vehicle's pitch to point the sensors and instruments mounted in the connection body (4) or in the bay (40). In fact, in order to adjust the vehicle's pitch, it is possible to drive both the third actuator (13) and wheel drive actuators (11)(12) in opposite directions, thus changing the vehicle's pitch without generating any forward or backward rover motion. Because the robotic two-wheeled vehicle (1) is symmetrical and has the ability to rotate its body a full 360°, neither side is considered upside down or right side up, except as it relates to the direction in which the tether (9) is reeled. By using hemispherical or convex/concave wheels (2)(3) on either end, the robotic two-wheeled vehicle (1) can operate in any configuration and hence support sudden drops and flips.

(3) The first drum (5) further provides a conduit for the tether (9) to prevent entanglement with the wheels (2)(3). Running the tether (9) through the first drum (5) gives the robotic two-wheeled vehicle (1) greater stability and provides a restoring force for the first drum (5) by keeping it off the ground during steep slope operations.

(4) In addition to the redundant spool or second drum (8), the first drum (5) further provides a redundant actuator, which can drive the robotic two-wheeled vehicle (1) following a failure of one or more drive wheels (11)(12) since all robotic two-wheeled vehicle motors rotation axes are aligned. If one of the wheel actuators (11)(12) fail, the robotic two-wheeled vehicle (1) can be moved in a straight line by rotating the first drum (5) around the axis (4) while the arm (6) rests on the ground. This will cause the connection body (4) and wheels (2)(3) (which are fixed relative to each other when the wheel actuator fails) to turn. Such traverse mode is called a tumbling mode. The tumbling mode can be used for operating on slopes and for rolling off rocks if the rover high centers its body on a rock.

Since the robotic two-wheeled vehicle (1) can rotate its body relative to the terrain (e.g., tilt the connection body (4)) to point the instruments perpendicular to the ground, the instrument bays (40) act like a turret mounted on a robotic arm. By rotating the instrument bay relative to the terrain by means of the first actuator or second actuator, each instrument head (47) can be oriented perpendicular to the terrain surface. The separation of the third actuator (13) of the first drum (5) and the fourth actuator (14) of the second drum (8) can enable such instrument pointing while the robotic two-wheeled vehicle (1) is hanging vertically on its tether. More in particular, once the instrument is pointed perpendicular to the terrain surface, the small four-bar mechanism (46) can deploy the contact instrument's sensor head to acquire measurements (FIG. 8). Once the measurement is acquired, the sensor (47) can be retracted and the connection body (4) can be rotated to allow a different instrument in the instrument bay (40) to be pointed perpendicular to the surface (or pointed at a desired angle). Non-contact instruments, such as optical instruments, can acquire measurements without deploying the four-bar mechanism.

As already mentioned above, the fourth actuator (14) can drive the second drum (8), which then reels and unreels the tether (9). In addition, when operated in conjunction with the third actuator (13) of the first drum (5), the robotic two-wheeled vehicle (1) can apply a torque that is equal to the sum of both of the actuators' torques to pull the robotic two-wheeled vehicle upwards, thus increase the overall torque (or pull of the rover).

The robotic vehicle (100) can regress from a lander and traverse without a tether (9) for several kilometers in a substantially uneven terrain. The robotic vehicle (100) also has the ability to traverse over rocks that are as high as the radius of the wheel. Once the robotic vehicle (100) rover reaches the edge of the extreme terrain, the robotic two-wheeled vehicle (1) rover separates from the robotic vehicle (100) rover as shown in FIGS. 2 and 3. The separation or the undocking process uses the robotic two-wheeled vehicle (1) mobility to drive the robotic two-wheeled vehicle (1) away from the central module (101). During that process, the central module deploys legs that anchor the central module and the robotic two-wheeled vehicle (1) into the ground. The anchoring process ensures that the robotic two-wheeled vehicle (1) does not pull the central module (101) and the other robotic two-wheeled vehicle (1) over the edge. After separation, the robotic two-wheeled vehicle (1) can traverse the rough terrain, descend into craters, collect in-situ measurements and samples, and return samples to the central module for further analysis (the mother ship). Upon its return, the robotic two-wheeled vehicle (1) can re-dock with the central module (101) and the rejoined robotic vehicle (100) rover traverses to a new location to resume its exploration. A similar process can be used when the robotic two-wheeled vehicle (1) is hosted on a larger rover in a marsupial configuration. In addition to planetary applications, this technology can be used in a number of terrestrial applications. It could enable autonomous exploration of other high-risk terrestrial areas such as those proximal to volcanoes. It can be used in search and rescue missions in disaster sites. The robotic two-wheeled vehicle's ability to descend without a terrain surface to rest on can make it amenable to descending into bore holes such as those used in search and rescue mission following mining accidents. The robotic two-wheeled vehicle (1) can also be used in military applications. One possible use can be for retrieving injured soldiers from the battlefield by operating as an autonomous stretcher for carrying soldiers out of harm's way. A second possible use is that the robotic two-wheeled vehicle (1) can dock to the stretcher and drive the injured person to safety. Other example applications can use the central module to provide critical supplies to hard to access locations.

Figure 27:
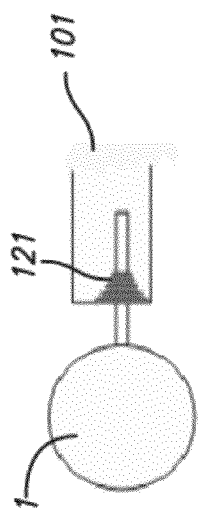
FIG. 27 schematically shows a connection for a robotic two-wheeled vehicle according to an embodiment of the present disclosure.
Figure 28:
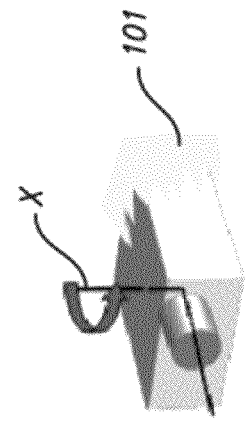
FIGS. 28-29 schematically shows possible movements of a robotic two-wheeled vehicle according to some embodiments of the present disclosure.
Figure 29:
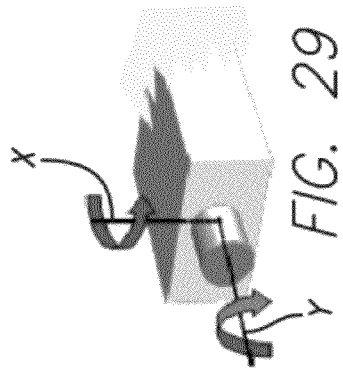
Figure 26:
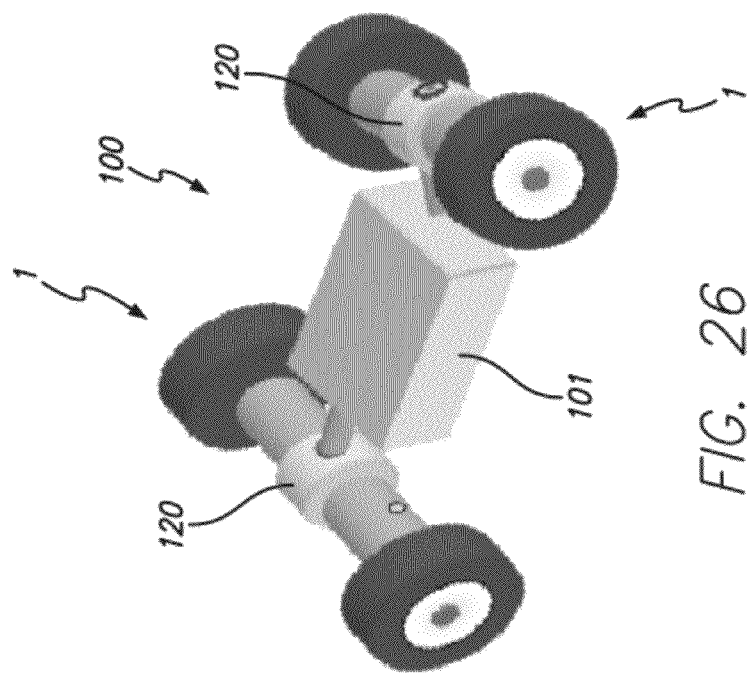
FIG. 26 shows a perspective view of a dual robotic two-wheeled vehicle according to an embodiment of the present disclosure.
Figure 30:
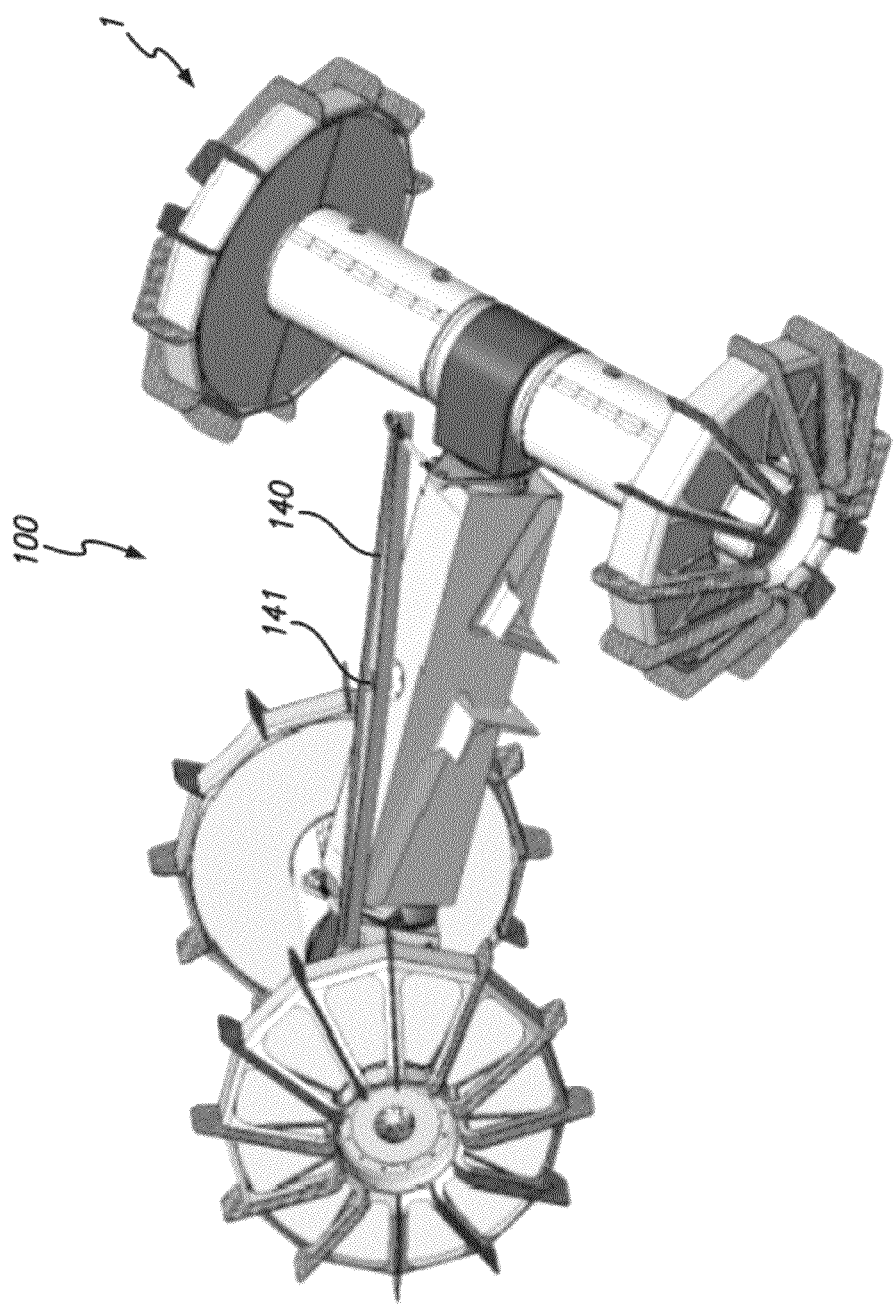
FIG. 30 shows a perspective view of a dual robotic two-wheeled vehicle according to an embodiment of the present disclosure.

According to further embodiments, the dual robotic two-wheeled vehicle (100) can have different configurations or orientations based on relative movements of one or more of the robotic two-wheeled vehicles (1) with respect to the central module (101). According to further aspects of the disclosures, the two robotic two-wheeled vehicles (1) of the dual robotic two-wheeled vehicle (100) can assume different configurations based on its front or back positions in the dual robotic two-wheeled vehicle (100). Possible configurations are based on a joint (120) between the one or more robotic two-wheeled vehicles (1) with respect to the central module (101) (FIG. 26). In other words, the possible configurations of the two robotic two-wheeled vehicles (1) are based on a direct joint between the central module (101) and one or more robotic two-wheeled vehicles (1). The joint can include a spring and a spring holder (121), which allows oscillation of the one or more robotic two-wheeled vehicles (1) (FIG. 27). Alternatively, the joint can include a passive yaw (not shown), which allows rotation of the one or more robotic two-wheeled vehicles (1) around a vertical axis (X) (FIG. 28). Alternatively, the joint can include a passive yaw and a roll, which allows rotation of the one or more robotic two-wheeled vehicles (1) around a vertical axis (X) and a horizontal axis (Y) (FIG. 29).

Figure 32:
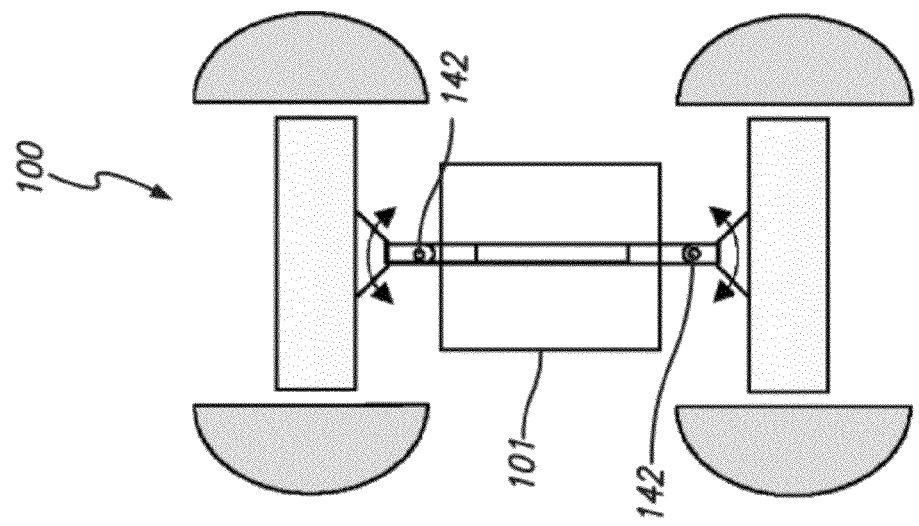
FIGS. 31-32 schematically show top views of dual robotic two-wheeled vehicles according to some embodiments of the present disclosure.
Figure 31:
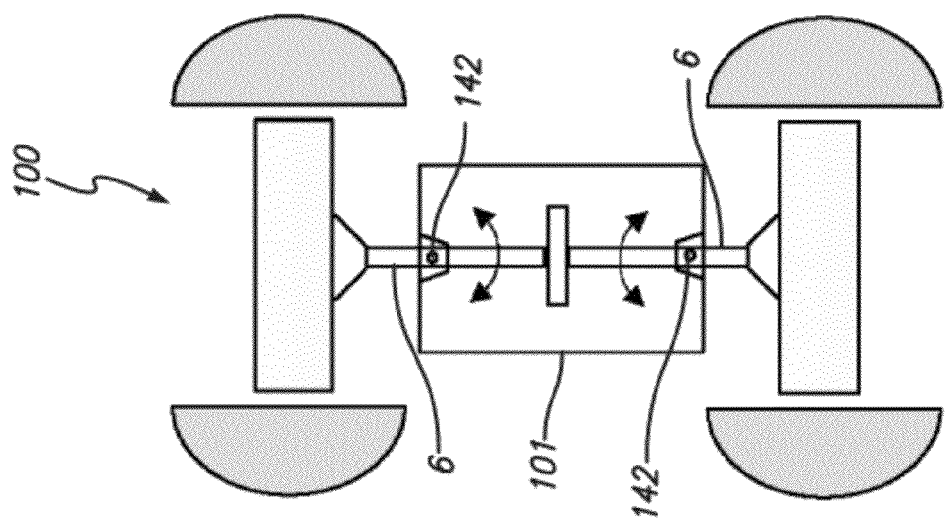

In addition, the central module (101) can include a four-based mechanism (140) pivoting in the center (141) of the connection body (101), which forces a roll on one of the two robotic two-wheeled vehicles (1) in the opposite direction, around a horizontal axis. According to further embodiments a swinging connection around a vertical axis can be provided between the tether arm (6) of the one or more robotic two-wheeled vehicles (1) and the central module (101), as shown in FIGS. 31 and 32. FIG. 31 shows pivoting or swinging connections (142) between the arms (6) and the central module (101), where the connections (142) are housed inside the central module (101). FIG. 32 show pivoting or swinging connections (142) between the arms (6) and the central module (101), where the connections (142) are outside the central module (101).

As already mentioned above, the robotic two-wheeled vehicle (1) is capable of turning about a vertical axis without a steering mechanism since the vehicle is differentially driven. Such feature can eliminate excessive wiring outside of the body, thus reducing heat loss, which can simplify thermal design, and ultimately contributing to the robotic two-wheeled vehicle (1) in maintaining a constant internal temperature, even in the cold environments of the outer solar system. Such thermal engineering approach also allows for lower cost avionics and actuator components, thus reducing the overall cost of the robotic two-wheeled vehicle. Inside the connection body, the robotic two-wheeled vehicle (1) collocates its sensors, actuators, electronics, batteries, and instruments/sensors and instrument bays. Such configuration also provides compactness for launching into space. The robotic two-wheeled vehicle (1) can be equipped with computational devices (including digital and analog I/O, CAN bus) and communication electronics, stereo cameras, an inertial sensor, and encoders and brakes on each wheel. Such electronics and on-board software can enable the robotic two-wheeled vehicle (1) to autonomously perceive its environment, develop 3-dimensional maps, identify obstacles, plan paths, and navigate its environment. In addition to these electronics, the robotic two-wheeled vehicle (1) can be loaded with different payload instruments to conduct different missions.

Since the body of the robotic two-wheeled can act as a winch such that the tether is wound and unwound around the connection body or the central drum as it rotates relative to the wheels, the host platform configuration can be reduced to a simple fixed mount, through which power and communication can be optionally routed.

Robust mobility in extreme terrains can be enabled by a combination of the robotic two-wheeled vehicle's tether (9) and the wheel design. The tether provides climbing and anchoring forces on steep slopes or cliffs when wheel traction is not possible or insufficient. The grouser (paddle) wheels provide sufficient traction in sandy and loose soil, as well as enable the robotic two-wheeled vehicle (1) to climb over obstacles substantially as large as (height-wise) the radius of the wheel.

Figure 4:
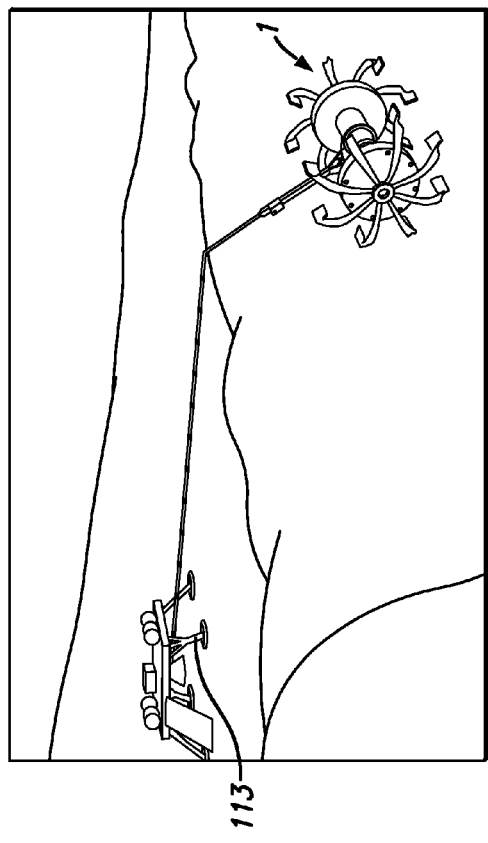
FIG. 4 shows a perspective view of a robotic two-wheeled vehicle according to an embodiment of the present disclosure.
Figure 5:
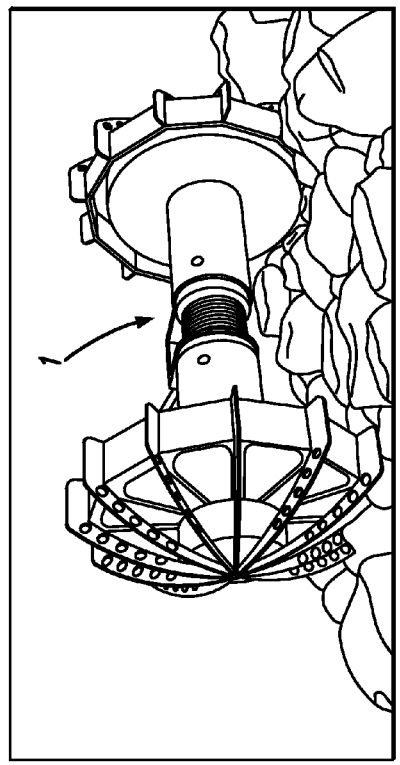
FIG. 5 shows a perspective view of a robotic two-wheeled vehicle according to an embodiment of the present disclosure.

In addition, the robotic two-wheeled vehicle (1) has a minimalist design, overcoming many constraints and challenges which can be imposed by space missions and extreme terrain. A minimalist design adds flexibility in mission deployment scenarios. Since the robotic two-wheeled vehicle (1) has a low mass, it can be mounted as an add-on daughter-ship to a larger mission. With only a few actuators—one for each wheel and one or two for the caster arm and body rotation—the robotic two-wheeled vehicle (1) is relatively inexpensive to manufacture, thus facilitating deployment of several redundant copies in a single mission. In addition, since the robotic two-wheeled vehicle (1) can use a simple mount, the robotic two-wheeled vehicle (1) can be anchored by a larger rover or a lander (FIG. 4).

The simple design of the robotic two-wheeled vehicle reduces failure rates. Fewer motors lead to fewer moving parts, which in turn increases mechanical robustness. Since the robotic two-wheeled vehicle (1) is intended to operate on risky terrain, reducing possible internal failures is vital to mission success. By routing the tether through the arm and wrapping it around a central cylinder (second drum), the robotic two-wheeled vehicle's own body can act as the reel for the winch. Unreeling in this manner, the tether can be laid over the terrain as the robotic two-wheeled vehicle (1) descends, and the tether is collected as the rover returns to the host. In contrast to a winch that is mounted on the host, this approach minimizes abrasion on the tether from rocks and cliff faces.

The examples set forth above are provided to give those of ordinary skill in the art a complete disclosure and description of how to make and use the embodiments of the disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A robotic two-wheeled vehicle comprising:
   a first wheel;
   a second wheel;
   a connection body, the connection body being interposed between the first wheel and
   the second wheel, the first wheel, the second wheel and the connection body being aligned along, and centered to, a longitudinal axis, wherein the connection body comprises:
   i) a first drum coaxially located in a central region of the connection body, the first drum supporting a hollow arm projecting radially from the first drum; and
   ii) a second drum coaxially located inside the first drum, the robotic two-wheeled vehicle further comprising:
   a first actuator adapted to drive and rotate the first wheel;
   a second actuator adapted to drive and rotate the second wheel;

a third actuator adapted to drive and rotate the first drum; and a fourth actuator adapted to drive and rotate the second drum, the first actuator, the second actuator, the third actuator and the fourth actuator being controlled independently of each other.

2. The robotic two-wheeled vehicle of claim 1, wherein the first actuator, the second actuator, the third actuator and the fourth actuator rotate the first wheel, second wheel, first drum and second drum, respectively, around the longitudinal axis.

3. The robotic two-wheeled vehicle of claim 1, further comprising a tether housed in the hollow arm and fixedly connected to the second drum.

4. The robotic two-wheeled vehicle of claim 1, wherein the robotic two-wheeled vehicle is symmetrical with respect to a plane passing through the hollow arm orthogonally to an X-axis.

5. The robotic two-wheeled vehicle of claim 1, further comprising a first container and a second container in the connection body, the first container located between the first wheel and the central region of the connection body, and the second container located between the second wheel and the central region of the connection body.

6. The robotic two-wheeled vehicle of claim 5, wherein the first container and the second container each comprises a plurality of compartments.

7. The robotic two-wheeled vehicle of claim 6, wherein the plurality of compartments are further configured as one central compartment, and four peripheral compartments, each compartment of the plurality of compartments being angularly distributed around the central compartment.

8. The robotic two-wheeled vehicle of claim 7, wherein each compartment of the plurality compartments houses one or more devices selected from the group consisting of: batteries, the first actuator, the second actuator, the third actuator, the fourth actuator, avionics, camera, and camcorder.

9. The robotic two-wheeled vehicle of claim 8, wherein the camera is located in the central compartment, further comprising a lens housing inserted in a through-hole passing through one peripheral compartment and exposed to an external environment.

10. A dual robotic two-wheeled vehicle, comprising two robotic two-wheeled vehicles of claim 1 and a central module interposed between the two robotic two-wheeled vehicles.

11. A robotic two-wheeled vehicle comprising:
a first wheel;
a second wheel;
a connection body, the connection body being interposed between the first wheel and the second wheel, the first wheel, the second wheel and the connection body being aligned along, and centered to, a longitudinal axis, wherein the robotic two-wheeled vehicle comprises a mechanism for deploying one or more instruments and/or sensors from at least one of the first wheel and second wheel towards an external environment, one or more of the instruments and/or sensors being mounted on the mechanism, wherein the mechanism is associated to at least one of the first wheel and the second wheel, wherein the mechanism is a single degree-of freedom four-bar mechanism.

12. A robotic two-wheeled vehicle comprising:
a first wheel;
a second wheel;
a connection body, the connection body being interposed between the first wheel and the second wheel, the first wheel, the second wheel and the connection body being aligned along, and centered to, a longitudinal axis, wherein the connection body comprises:
i) a first drum coaxially located in a central region of the connection body, the first drum supporting a hollow arm projecting radially from the first drum; and
ii) a second drum coaxially located inside the first drum;
the robotic two-wheeled vehicle further comprising:
a first actuator and a second actuator, the first actuator connected to the first drum, and the second actuator connected to the second drum; and
a tether housed in the hollow arm and fixedly connected to the second drum,
wherein spinning the first drum in a first direction and spinning the second drum in a direction opposite the direction of rotation of the first drum, the tether is wound or unwound about the second drum,
wherein spinning the first drum and the second drum in a same direction of rotation, the second drum rotates without reeling or unreeling the tether on the second drum, whereby the reeling and the unreeling of the tether is independent of motion of the first wheel and the second wheel.

13. The robotic two-wheeled vehicle of claim 12, further comprising a third actuator for actuating a level winding mechanism located between the hollow arm and the second drum to maximize an amount of tether that is wrapped on the second drum and to separate tension between the second drum and the first drum.

14. The robotic two-wheeled vehicle of claim 12, wherein a level winding mechanism includes a first rollers and second rollers, wherein the second rollers are mounted on a roller mechanism that slides over first rollers, wherein tether runs between the first rollers and second rollers to orderly wind the tether around the second drum.

15. The robotic two-wheeled vehicle of claim 12, further comprising a tether tension sensing element.

16. The robotic two-wheeled vehicle of claim 15, wherein said tether tension sensing element further comprises a first plate attached to the second actuator and a second plate connected to the first plate with springs and attached to the second drum, wherein a tension of the tether is measured as a displacement between said first plate and said second plate.

17. A dual robotic two-wheeled vehicle, comprising two robotic two-wheeled vehicles of claim 12 and a central module interposed between the two robotic two-wheeled vehicles.

* * * * *